(12) United States Patent
Suzuki et al.

(10) Patent No.: US 12,343,769 B2
(45) Date of Patent: Jul. 1, 2025

(54) COATING FILM FOR STRUCTURE, SET OF COATING MATERIALS FOR FORMING COATING FILM, COATING MATERIAL FOR UNDERCOAT LAYER, AND COATING METHOD

(71) Applicant: NITTO DENKO CORPORATION, Ibaraki (JP)

(72) Inventors: Satoru Suzuki, Ibaraki (JP); Tomoya Ogawa, Ibaraki (JP); Tomonari Naito, Ibaraki (JP); Naoki Kurata, Ibaraki (JP); Satomi Yoshie, Ibaraki (JP); Kohei Nagao, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 974 days.

(21) Appl. No.: 16/338,282

(22) PCT Filed: Sep. 27, 2017

(86) PCT No.: PCT/JP2017/034951
§ 371 (c)(1),
(2) Date: Mar. 29, 2019

(87) PCT Pub. No.: WO2018/062267
PCT Pub. Date: Apr. 5, 2018

(65) Prior Publication Data
US 2021/0107044 A1   Apr. 15, 2021

(30) Foreign Application Priority Data
Sep. 29, 2016   (JP) ................. 2016-191401

(51) Int. Cl.
*B08B 17/02*   (2006.01)
*B05D 5/00*   (2006.01)
(Continued)

(52) U.S. Cl.
CPC ............... *B08B 17/02* (2013.01); *B05D 5/00* (2013.01); *B05D 7/02* (2013.01); *B05D 7/544* (2013.01);
(Continued)

(58) Field of Classification Search
None
See application file for complete search history.

(56) References Cited

U.S. PATENT DOCUMENTS 5,092,952 A   3/1992  Minnick et al.
5,192,603 A   3/1993  Slater et al.
(Continued)

FOREIGN PATENT DOCUMENTS

CL   201501018 A1   8/2015
CN   100503234 C    6/2009
(Continued)

OTHER PUBLICATIONS

JP2004-202385Englishmachinetranslation JPO (2004).*
(Continued)

*Primary Examiner* — Tamra L. Dicus
(74) *Attorney, Agent, or Firm* — HAUPTMAN HAM, LLP

(57) ABSTRACT

A coating film capable of being peeled off in the shape of sheet to facilitate a coating film removal work, and is less likely to peel even after long periods of use on an underwater structure is provided. The coating film comprises an undercoat layer to be bonded to an underwater structure, and an antifouling layer bonded to the undercoat layer, wherein: a 100-gram underwater constant load peeling degree of the coating film is less than 5; a ratio of a tensile breaking strength of the coating film to an adhesive force of the coating film with respect to the underwater structure, as measured after immersing the coating film in pure water at (Continued)

60° C. for 5 weeks is 1.5 or more; and a 1-mm square cross-cut stretching-caused peeling degree of the antifouling layer with respect to the undercoat layer is 0.05 or less.

7 Claims, 3 Drawing Sheets

(51) Int. Cl.

| | |
|---|---|
| B05D 7/00 | (2006.01) |
| B05D 7/02 | (2006.01) |
| B63B 59/04 | (2006.01) |
| C09D 5/16 | (2006.01) |
| C09D 5/20 | (2006.01) |
| C09D 153/02 | (2006.01) |
| C09D 183/04 | (2006.01) |
| E02B 17/00 | (2006.01) |
| E02D 29/09 | (2006.01) |

(52) U.S. Cl.
CPC ............ *B63B 59/04* (2013.01); *C09D 5/1675* (2013.01); *C09D 5/1693* (2013.01); *C09D 5/20* (2013.01); *C09D 153/025* (2013.01); *C09D 183/04* (2013.01); *E02B 17/0026* (2013.01); *E02D 29/06* (2013.01); *E02D 2300/0001* (2013.01); *E02D 2300/0006* (2013.01); *E02D 2300/0025* (2013.01)

(56) References Cited

U.S. PATENT DOCUMENTS

| | | | |
|---|---|---|---|
| 5,248,367 | A | 9/1993 | Minnick et al. |
| 5,248,369 | A | 9/1993 | Minnick et al. |
| 5,597,865 | A | 1/1997 | Jackson |
| 5,851,618 | A | 12/1998 | Liddell et al. |
| 6,183,567 | B1 | 2/2001 | Kamijo et al. |
| 9,410,045 | B2 | 8/2016 | Ashmore et al. |
| 2004/0131895 | A1* | 7/2004 | Hirata ................... B60C 13/002 427/457 |
| 2006/0083854 | A1* | 4/2006 | Ober ....................... C08L 53/02 427/430.1 |
| 2009/0232764 | A1 | 9/2009 | Ober et al. |
| 2014/0141263 | A1 | 5/2014 | Jones et al. |
| 2014/0377552 | A1 | 12/2014 | Kurata et al. |
| 2015/0259543 | A1 | 9/2015 | Ashmore et al. |
| 2016/0122593 | A1 | 5/2016 | Kurata et al. |

FOREIGN PATENT DOCUMENTS

| | | |
|---|---|---|
| CN | 102037031 A | 4/2011 |
| CN | 103608411 A | 2/2014 |
| EP | 0 472 822 A2 | 3/1992 |
| EP | 0 532 273 A1 | 3/1993 |
| EP | 0 712 915 A1 | 5/1996 |
| EP | 2796522 A1 | 10/2014 |
| JP | 05-244854 A | 9/1993 |
| JP | 07150046 A * | 6/1995 |
| JP | H7-315282 A | 12/1995 |
| JP | 11-131022 A | 5/1999 |
| JP | 11-199802 A | 7/1999 |
| JP | 2001-220524 A | 8/2001 |
| JP | 2001-327914 A | 11/2001 |
| JP | 2002-080778 A | 3/2002 |
| JP | 2003-327912 A | 11/2003 |
| JP | 2004-202385 A | 7/2004 |
| JP | 2009-167237 A | 7/2009 |
| JP | 2011-240228 A | 12/2011 |
| JP | 2012-034663 A | 2/2012 |
| JP | 2014-58616 A | 4/2014 |
| JP | 2015-028154 A | 2/2015 |
| WO | WO-8000554 A1 * | 4/1980 ............ C09D 5/16 |
| WO | 91/04299 A1 | 4/1991 |
| WO | 93/06180 A1 | 4/1993 |
| WO | 93/10159 A1 | 5/1993 |
| WO | 2009/111023 A2 | 9/2009 |
| WO | 2014/208594 A1 | 12/2014 |

OTHER PUBLICATIONS

Hawley NR (2007).*
Hawley—NBR (2007).*
The extended European Search Report dated May 12, 2020 in connection with the counterpart European Patent Application No. 17856216.1.
Chilean Office Action for corresponding Chilean application No. 201900742 dated Mar. 16, 2020 with English Translation.
International Search Report for corresponding international application PCT/JP2017/034951 mailed on Nov. 28, 2017.
Office Action issued for corresponding Japanese Patent Application No. 2017-186201 on Jun. 7, 2021, along with an English machine translation.
Communication pursuant to Article 94(3) EPC issued on Feb. 20, 2023 for corresponding European Patent Application No. 17 856 216.1 (8 pages).
"Shin-Etsu Silicone—Reactive & Non-Reactive Modified Silicone Fluid (For North and South America)" 2006, Shin-Etsu Chemical Co., Ltd., <https://www.shinetsusilicones.com/files/literature/Modified%20Fluids%20Brochure%20-%20SESA.pdf> (10 pages).
Communication pursuant to Article 94(3) EPC mailed Aug. 21, 2024 for corresponding European Patent Application No. 17 856 216.1 (5 pages).
"Kraton® FG-1901X Styrene Ethylene Butylene Styrene Block Copolymer Kraton Polymers LLC", iIDES Prospector, Feb. 4, 2010 (1 page).
Kraton, "Kraton™ Polymers for Oil Modification Versatile Solutions for Synthetic and Natural Based Oils", Sep. 6, 2016 (8 pages).
"Kraton® Thermoplastic Rubbers in oil gels", Technical Bulletin Shell Chemical Company, Apr. 1989, pp. 1-10 (10 pages).
Communication pursuant to Article 94(3) EPC issued on Mar. 27, 2025 for corresponding European Patent Application No. 17 856 216.1 (6 pages).
Kim et al., "Effect of Blending Thermoplastic Elastomer with Natural Rubber Compound and Studies of Short Fiber Reinforced Rubber Composite", Journal of Applied Polymer Science, vol. 61, No. 3, Jul. 18, 1996, pp. 431-438 (8 pages), cited in NPL No. 1.
Kraton Polymers, "Kraton Polymers: Driving Innovation in Pressure Sensitive Adhesives", Fact Sheet, Publication K0409, Sep. 1, 2004, pp. K1-K20 (20 pages), cited in NPL No. 1.
Tanrattanakul et al., "Toughening PET by blending with a functionalized SEBS block copolymer", Polymer, vol. 38, No. 9, Apr. 1, 1997, pp. 2191-2200 (10 pages), cited in NPL No. 1.

* cited by examiner

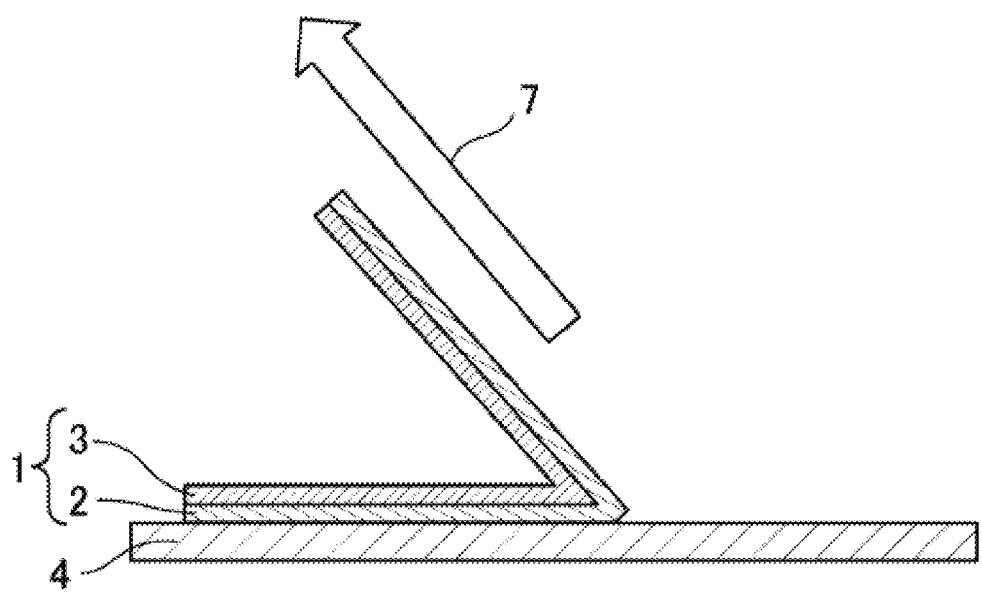

COATING FILM FOR STRUCTURE, SET OF COATING MATERIALS FOR FORMING COATING FILM, COATING MATERIAL FOR UNDERCOAT LAYER, AND COATING METHOD

CROSS REFERENCE TO RELATED APPLICATION

This application claims the priority of Japanese Patent Application No. 2016-191401, filed on Sep. 29, 2016, in the JPO (Japanese Patent Office). Further, this application is the National Phase Application of International Application No. PCT/JP2017/034951, filed on Sep. 27, 2017, which designates the United States and was published in Japan. Both of the priority documents are hereby incorporated by reference in their entireties.

TECHNICAL FIELD

The present invention relates to a coating film for preventing contaminants from adhering to a structure to protect the structure, particularly, a coating film for preventing the adherence of aquatic organisms to an underwater structure, and to a coating material for forming the coating film, and a method for forming the coating film. To be more specific, the present invention relates to a coating film, a coating material and a method for preventing aquatic organisms from adhering to and propagating on an underwater structure, for example, a boat/ship, a buoy, a harbor facility, a offshore oilfield facility, a water conduit for power plant cooling water, a water-floating walkway, a water gate, an underwater sensor, an underwater camera, an underwater light, an underwater pump, an underwater pipe, an underwater power generation facility (e.g., a tidal current power generation facility, an ocean current power generation facility, a wave-power generation facility, or a on-sea wind-power generation facility), an underwater rotor such as a propeller or screw, or one of various underwater anchorage devices such as an underwater wire.

BACKGROUND ART

In an underwater structure such as a boat/ship, aquatic organisms such as barnacles, oysters, blue mussels, Hydra, serpulas, sea squirts, bryozoans, sea lettuces, green layers and periphytic diatoms, can adhere to and propagate on a portion thereof in contact with water. Such aquatic organisms cause poor machine performance of a facility such as decrease in heat conductivity, and poor aesthetic appearance of a sightseeing facility or a boat/ship. Particularly, in a boat/ship, they increase a fluid resistance, leading to slowdown in speed or deterioration in fuel economy of the boat/ship. Moreover, aquatic organisms adhering to a boat/ship can be spread over other areas, resulting in becoming a factor leading to disturbance to water environment.

In the light of such circumstances, in the following Patent Document 1, there is disclosed an antifouling coating material to be coatingly applied onto a surface of an underwater structure to prevent aquatic organisms from adhering onto the underwater structure. Differently from conventional techniques, this antifouling coating material uses a composition having low toxicity, which is enabled by utilizing a photocatalyst. Further, as a measure against a problem that a composition having an antifouling effect is enclosed by a binder, resulting in loss of the effect, the antifouling coating material comprises an antifoulant-containing layer provided on the side of the surface of the underwater structure, and an adhesive provided such that it can be interposed between the antifoulant-containing layer and the surface of the structure to bond them together, Further, in the following Patent Document 2, there is disclosed an invention which provides an antifouling composition containing: bis(dimethyldithiocarbamoyl) zinc ethylenebis(dithiocarbamate); (meth) acrylate resin; polyether silicone having a number average molecular weight of 500 to 20,000; and a monobasic acid having a molar weight of 250 or more, or a metal salt thereof. This antifouling composition is intended to improve not only an antifouling property but also storage stability.

CITATION LIST

Parent Document

Patent Document 1: JP 2001-220524A
Patent Document 2: JP 2002-80778A

SUMMARY OF INVENTION

Technical Problem

However, in the conventional coating materials, it is necessary to remove an old coating film due to degradation in antifouling performance thereof. Work of removing such an old coating film is hard and high in cost, because of the need to remove the coating film by grinding and others. For example, in the antifouling coating material, an old coating film needs to be removed by solving the adhesive using an organic solvent, so that it is necessary to take a lot of time and effort. On the other hand, in the Patent Document 2, there is no disclosure about peeling off the coating film in the shape of sheet, although it makes mention of easiness to remove the antifouling coating material. Therefore, the coating film removal work still involves difficulties. After all, the Patent Document 2 discloses only an invention in which the coating film is removed by grinding, so that the removal work according to this invention can be deemed to be hard and high in cost.

Further, the invention disclosed in the Patent Document 2 is intended to extend an effective life of the coating film, wherein an approach to extend the effective life is to moderate degradation in the antifouling performance. However, when the underwater structure is used for long periods of tine, adhesive force decreases, and thereby the coating film becomes likely to peel. Particularly, in the case where the underwater structure is a structure movable in water, such as a boat/ship, the coating film can peel from the underwater structure because it receives resistance from water.

Further, in a general structure other than the underwater structure, e.g., in an on-land structure, such as a roof or an external wall, it is also expected to develop a coating material providing a coating film which is less likely to peel even after being exposed to weather, and is capable to being easily peeled off and replaced to new one when damaged.

Therefore, the present invention has been made to solve the above problems, and an object thereof is to provide a coating film which is capable of being peeled off in the shape of sheet to facilitate a coating film removal work, and is less likely to peel even after long periods of use on. e.g., an underwater structure which involves traveling under water, or an underwater structure which remains still and receives a water flow resistance, such as an underwater structure which is used in places where it receives angry waves. It is another object of the present invention to provide a set of coating materials for forming the coating film having the above properties, and a method for forming the coating film. It is yet another object of the present invention to provide an undercoat layer-forming coating material for forming a coating film which is less likely to peel and is capable of facilitating a coating film peel-off work, even when it is used on any structure other than an underwater structure.

Solution to Technical Problem

According to a first aspect of the present invention, there is provided a coating film on a structure. The coating film comprises an undercoat layer to be bonded to the structure, and an antifouling layer bonded to the undercoat layer, wherein: a 100-gram underwater constant load peeling degree of the coating film is less than 5 (mm/20 mm); a ratio of a tensile breaking strength (N/20 mm) of the coating film to an adhesive force (N/20 mm) of the coating film with respect to an underwater structure, as measured after immersing the coating film in pure water at 60° C. for 5 weeks, is 1.5 or more; and a 1-mm square cross-cut stretching-caused peeling degree of the antifouling layer with respect to the undercoat layer is 0.05 or less.

In the coating film according to the first aspect of the present invention, the undercoat layer preferably comprises an elastomer. More preferably, with a view to improving adhesion with respect to the antifouling layer, the elastomer is modified by a compound containing a polar group. Particularly, from a viewpoint of being resistant to degradation, the antifouling layer comprises a silicone resin.

The 100-gram underwater constant load peeling degree is preferably less than 3, more preferably less than 1, still more preferably less than 0.5, further preferably less than 0.2, much further preferably less than 0.1, most preferably 0.0. The ratio is preferably 3.0 or more, more preferably 5.0 or more, still more preferably 15 or more. The 1-mm square cross-cut stretching-caused peeling degree is preferably 0.04 or less, more preferably 0.03 or less, still more preferably 0.01, most preferably 0.00. The adhesive force is preferably from 4.0 to 15.

According to a second aspect of the present invention, there is provided a set of coating materials for forming a coating film which comprises an undercoat layer to be bonded to a structure, and an antifouling layer bonded to the undercoat layer, the set of coating materials comprising an undercoat layer-forming coating material for forming the undercoat layer, and an antifouling layer-forming coating material for forming the antifouling layer, wherein, when the undercoat layer-forming coating material is bonded as a layer having a thickness of 150 μm to PMMA (poly(methyl methacrylate)), and the antifouling layer-forming coating material is bonded as a layer having a thickness of 100 μm to the layer of the undercoat layer-forming coating material to form the coating film, a 100-gram underwater constant load peeling degree of the coating film is less than 5 (mm/20 mm): a ratio of a tensile breaking strength (N/20 mm) of the coating film to an adhesive force (N/20 mm) of the coating film with respect to the PMMA, as measured after immersing the coating film in pure water at 60° C. for 5 weeks, is 1.5 or more; and a 1-mm square cross-cut stretching-caused peeling degree of the layer of the antifouling layer-forming coating material with respect to the layer of the undercoat layer-forming coating material is 0.05 or less.

In the set of coating materials according to the second aspect of the present invention, the undercoat layer-forming coating material preferably comprises an elastomer, i.e., a thermoplastic elastomer or a thermosetting elastomer. Particularly preferably, the elastomer is a thermoplastic elastomer. More preferably, with the view to improving adhesion with respect to the antifouling layer, the elastomer is modified by a compound containing a polar group. Particularly, from the viewpoint of being resistant to degradation, the antifouling layer-forming coating material comprises a silicone resin.

The 100-gram underwater constant load peeling degree is preferably less than 3, more preferably less than 1, still more preferably less than 0.5, further preferably less than 0.2, much further preferably less than 0.1, most preferably 0.0. The ratio is preferably 3.0 or more, more preferably 5.0 or more, still more preferably 15 or more. The 1-mm square cross-cut stretching-caused peeling degree is preferably 0.04 or less, more preferably 0.03 or less, still more preferably 0.01, most preferably 0.00. The adhesive force is preferably from 4.0 to 15.

According to a third aspect of the present invention, there is provided a method for forming a coating film which comprises an undercoat layer to be bonded to a structure, and an antifouling layer bonded to the undercoat layer, the method comprising the steps of; applying an undercoat layer-forming material to the structure to form the undercoat layer, and applying an antifouling layer-forming material to the undercoat layer to form the antifouling layer, wherein, when the undercoat layer-forming coating material is bonded as a layer having a thickness of 150 μm to PMMA (poly(methyl methacrylate)), and the antifouling layer-forming coating material is bonded as a layer having a thickness of 100 μm to the layer of the undercoat layer-forming coating material to form the coating film, a 100-gram underwater constant load peeling degree of the coating film is less than 5 (mm/20 mm);

a ratio of a tensile breaking strength (N/20 mm) of the coating film to an adhesive force (N/20 mm) of the coating film with respect to the PMMA, as measured after immersing the coating film in pure water at 60° C. for 5 weeks, is 1.5 or more; and a 1-mm square cross-cut stretching-caused peeling degree of the layer of the antifouling layer-forming coating material with respect to the layer of the undercoat layer-forming coating material is 0.05 or less.

In the method according to the third aspect of the present invention, the undercoat layer-forming coating material preferably comprises an elastomer, i.e., a thermoplastic elastomer or a thermosetting elastomer. Particularly preferably, the elastomer is a thermoplastic elastomer. More preferably, with the view to improving adhesion with respect to the antifouling layer, the elastomer is modified by a compound containing a polar group. Particularly, from the viewpoint of being resistant to degradation, the antifouling layer-forming coating material comprises a silicone resin.

The 100-gram underwater constant load peeling degree is preferably less than 3, more preferably less than 1, yet more preferably less than 0.5, still more preferably less than 0.3, further preferably less than 0.2, much further preferably less than 0.1, most preferably 0.0. The ratio is preferably 3.0 or more, more preferably 5.0 or more, still more preferably 15 or more. The 1-mm square cross-cut stretching-caused peeling degree is preferably 0.04 or less, more preferably 0.03 or less, still more preferably 0.01, most preferably 0.00. The adhesive force is preferably from 4.0 to 15.

According to a fourth aspect of the present invention, there is provided an undercoat layer-forming coating material for forming an undercoat layer comprised in a coating film, wherein the coating film further comprises an antifouling layer made of a silicone resin and bonded to the undercoat layer, and the undercoat layer is bonded to a structure, and wherein, when the undercoat layer-forming coating material is bonded as a layer having a thickness of 150 µm to PMMA (poly(methyl methacrylate)), and the antifouling layer is bonded as a layer having a thickness of 150 µm to the layer of the undercoat layer-forming coating material to form the coating film, a 100-gram underwater constant load peeling degree of the coating film is less than 5 (mm/20 mm); a ratio of a tensile breaking strength (N/20 mm) of the coating film an adhesive force (N/20 mm) of the coating film with respect to the PMMA, as measured after immersing the coating film in pure water at 60° C. for 5 weeks, is 1.5 or more; and a 1-mm square cross-cut stretching-caused peeling degree of the antifouling layer with respect to the layer of the undercoat layer-forming coating material is 0.05 or less.

According to a fifth aspect of the present invention, there is provided an undercoat layer-forming coating material for forming an undercoat layer comprised in a coating film, wherein the coating film further comprises an antifouling layer made of a silicone resin and bonded to the undercoat layer, and the undercoat layer is bonded to a structure, and wherein, when the undercoat layer-forming coating material is bonded as a layer having a thickness of 150 µm to PMMA (poly(methyl methacrylate)), and the antifouling layer is bonded to the layer of the undercoat layer-forming coating material to form the coating film, an adhesive force of the coating film with respect to the PMMA is 0.5 (mm/20 mm) or more; a ratio of a tensile breaking strength (N/20 mm) of the coating film to the adhesive force (N/20 mm) is 1.5 or more; and a 1-mm square cross-cut stretching-caused peeling degree of the antifouling layer with respect to the layer of the undercoat layer-forming coating material is 0.05 or less.

In the undercoat layer-forming coating materials according to the fourth and fifth aspect of the present invention, the undercoat layer-forming coating material preferably comprises an elastomer. More preferably, with the view to improving adhesion with respect to the antifouling layer, the elastomer is modified by a compound containing a polar group.

The 100-gram underwater constant load peeling degree is preferably less than 3, more preferably less than 1, still more preferably less than 0.5, further preferably less than 0.2, much further preferably less than 0.1, most preferably 0.0. The ratio is preferably 3.0 or more, more preferably 5.0 or more, still more preferably 15 or more. The 1-mm square cross-cut stretching-caused peeling degree is preferably 0.04 or less, more preferably 0.03 or less, still more preferably 0.01, most preferably 0.00. The adhesive force is preferably from 4.0 to 15.

BRIEF DESCRIPTION OF DRAWINGS

FIG. 6 is a schematic sectional view for explaining a test for verifying peelability.

DESCRIPTION OF EMBODIMENTS

Figure 1:
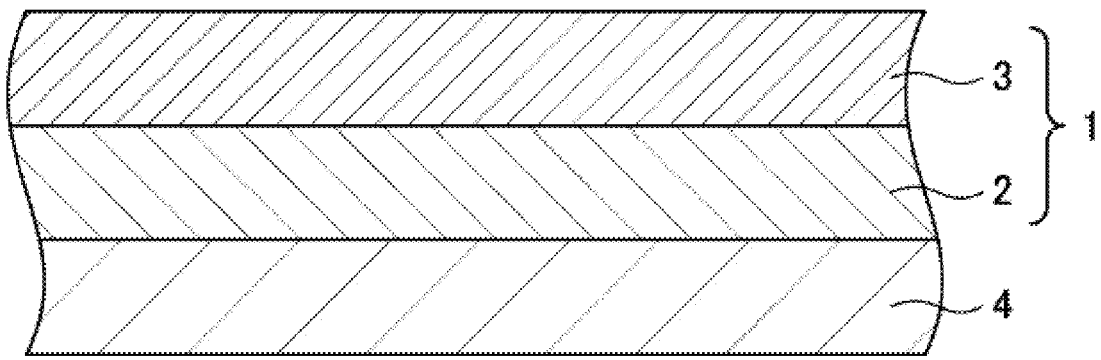
FIG. 1 is a schematic sectional view depicting a coating film according one embodiment of the present invention.

FIG. 1 is a schematic sectional view of a coating film 1 according to one embodiment of the present invention, which is coatingly applied on an underwater structure 4. The coating film is formed as a laminate which comprises an undercoat layer 2 and an antifouling layer 3 which are arranged in this order from the side of the underwater structure. This coating film is formed by: firstly preparing a set of coating materials which comprises a given undercoat layer-forming coating material and a given antifouling layer-forming coating material: applying the undercoat layer-forming coating material onto the underwater structure; drying the applied undercoat layer-forming coating material; applying the antifouling layer-forming coating material onto the dried undercoat layer-forming coating material; and drying the applied antifouling layer-forming coating material. The thickness of the undercoat layer is not particularly limited, but may be set depending on the intended use and the aftermentioned tensile breaking strength. For example, the thickness may be from 50 µm to 500 µm, preferably from 70 µm to 300 µm, more preferably from 100 µm to 200 µm. Further, because the aftermentioned tensile breaking strength mainly depends on the undercoat layer, this tensile breaking strength can be adjusted by changing the thickness of the undercoat layer. The thickness of the antifouling layer normally has almost no influence on the aftermentioned tensile breaking strength. Thus, the thickness of the antifouling layer is also not particularly limited, but may be appropriately set depending on the intended use or the like. For example, the thickness may be from 50 µm to 500 µm, preferably from 70 µm to 300 µm, more preferably from 100 µm to 200 µm.

The coating film depicted in FIG. 1 has the following properties.

<Underwater Constant Load Peeling Degree>

As used in this specification, the term "underwater constant load peeling degree" means the degree of easiness of peeling of the coating film with respect to a target adherend when the coating film receives resistance under water. Further, the term "100-gram underwater constant load peeling degree" means an amount by which the coating film is peeled from the target adherend at a time after the elapse of one hour since a load of 100 grams was imposed on the coating film under water, and more specifically, a value measured in the following manner.

Figure 2:
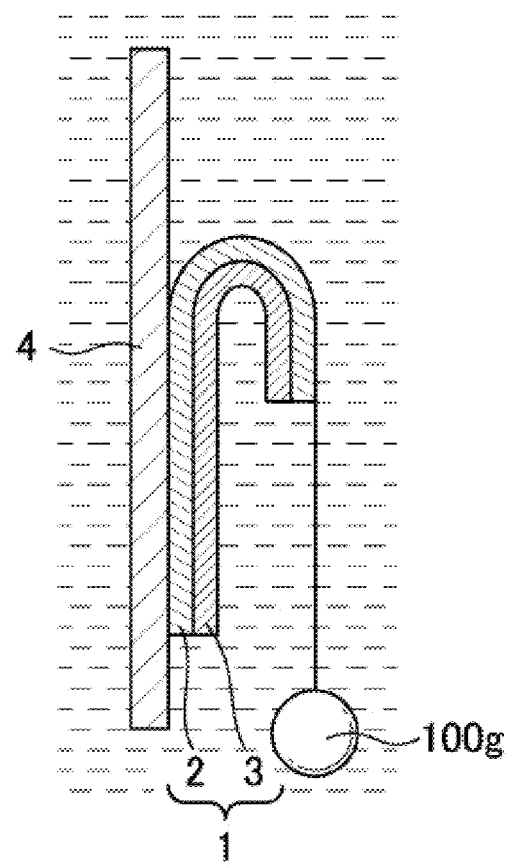
FIG. 2 is a schematic sectional view for explaining the technical meaning of an underwater constant load peeling degree.

FIG. 2 is a schematic sectional view illustrating the technical meaning of the 100-gram underwater constant load peeling degree (mm/20 mm). The undercoat layer-forming coating material and the antifouling layer-forming coating material are sequentially applied to the target adherend in a width of 20 mm to form the coating film. In this embodiment, the formed coating film is partially peeled by a certain distance, e.g., 20 mm, and a weight member adjusted to have a weight of 100 g under water is attached to the peeled portion. Then, the coating film is immersed in pure water at 23° C. in a tank, in a posture where a peel angle becomes 180 degrees. A distance [mm] over which the peeled portion is peeled from the adherend in one hour is the 100-gram underwater constant load peeling degree (mm/20 mm).

The reason that 100 g was adopted as the constant load is as follows. The following formula (1) relates to pressure resistance and is used to calculate a force arising in a plane having a width of 20 mm and a height of 500 µm by water having a flow speed of 30 knots. In the formula, the height is 500 µm, because a typical coating film has a thickness of 250 µm, and therefore, when the coating film is peeled at a peel angle of 180 degrees, the total thickness becomes 500 µm. That is, in a case where the coating film is peeled at a peel angle of less than 180 degrees, although a water flow-receiving plane in a peeled portion of the coating film becomes larger, the peeled portion of the coating film is moved backwardly (toward a downstream side of the water flow) so as to release a resistance. Thus, in this case, the water flow has an insignificant influence on peeling of the coating film. From the formula 1, it can be seen that a water pressure loaded on the peeled portion of the coating film at a flow speed of 30 knots is equivalent to a constant load of 100 gram. Here, the value "30 knots" is greater than a normal traveling speed of a boat/ship. Thus, a situation where peeling of the coating film due to the 100-gram constant load is sufficiently small means that the coating film can be used on a boat/ship and other underwater structure. Further, the underwater constant load peeling degree is roughly inversely proportional to the thickness of the coating film. Thus, for example, a value of the underwater constant load peeling degree measured when the thickness is 250 µm is twice a value of the underwater constant load peeling degree measured when the thickness is 500 µm. Considering this, even in a coating film having a thickness greater than 250 µm which is a typical thickness, an increase in water pressure load due to an increase in the thickness is cancelled out by a decrease in the underwater constant load peeling degree. Therefore, a difficulty degree of peeling can be presumed based on the 100-gram underwater constant load peeling degree.

$$Dp = (\rho \times U^2 \times Cp \times A)/2 \quad (1)$$

where Dp (load)
ρ (density of water): 1000 kg/m³
U (flow speed): 30 knots
Cp (pressure drag coefficient): 1
A (cross-sectional area): 20 mm (width)×500 µm (height)

In this present invention, a non-mobile underwater structure such as an ocean sensor or a dike can be selected as the adherend. Tidal flow is substantially slower than 15 knots, and is normally about 10 knots at the highest. Thus, as long as the coating film is not peeled even under the condition that it receives a water flow having a flow speed of 15 knots, it functions as an antifouling coating film for such a non-mobile underwater structure. From the formula (1), a resistance receiving from a water flow having a flow speed of 15 knots is equivalent to a 30-gram constant load. Then, an underwater constant load peeling degree measured using the 30-gram constant load (30-gram underwater constant load peeling degree) can be converted to the 100-gram underwater constant load peeling degree by the Eyring equation (formula (2)). Therefore, the 100-gram underwater constant load peeling degree serves as an index of not only durability (difficult) degree of peeling) under the 30-knot water flow but also durability under the 15-knot water flow $$\ln L = c^2 - n \cdot \ln S \quad (2),$$

where L: peeling time (effective life)
S: load (stress)
c: constant representing section
n: constant representing inclination The 100-gram underwater constant load peeling degree (mm/20 mm) of the coating film according to the present invention or the coating film formed by the method according to the present invention, with respect to an underwater structure, is less than 5, and, considering a coating film having a thickness greater than the typical thickness, preferably 4 or less, more preferably 3 or less, yet more preferably less than 1, still more preferably less than 0.5, yet still more preferably 0.3 or less, further preferably 0.2 or less, much further preferably 0.1 or less, most preferably 0.0. In regard to the set of coating materials and the undercoat layer-forming coating material for forming the coating film, the 100-gram underwater constant load peeling degree of the resulting coating film with respect to PMMA (poly(methyl methacrylate)) is less than 5, preferably 4 or less, more preferably 3 or less, yet more preferably less than 1, still more preferably less than 0.5, yet still more preferably 0.3 or less, further preferably 0.2 or less, much further preferably 0.1 or less, most preferably 0.0. The reason that, in regard to the set of coating materials and the undercoat layer-forming coating material, the 100-gram underwater constant load peeling degree is determined using PMMA as the adherend is that a typical material for use in forming a surface of an underwater structure or the like includes gel coat (acrylic-based polymer/polystyrene, etc.), epoxy resin, enamel (acrylic-based polymer, etc.), any of various metals (aluminum, aluminum alloy such as aluminum bronze, stainless steel, and titanium), and antifouling paint, wherein PMMA has intermediate properties among these surface-forming materials. Therefore, a coating material exhibiting preferred properties when using PMMA as the adherend can be deemed to bring out preferred properties at least when using any of the typical materials as the adherend. The same reason is also applied to other parameters using PMMA as the adherend. The coating film according to the present invention or the coating film formed using the set of coating materials or the undercoat layer-forming coating material is small in terms of the 100-gram underwater constant load peeling degree, and provides an advantageous effect that it is less likely to peel when used on an underwater structure. Relating to the above, examples of other materials for use in forming a surface of an underwater structure include polyurethane, polyethylene, polypropylene, polycarbonate, polyethylene terephthalate, polyacetal resin, and ABS (acrylonitrile butadiene styrene) resin.

<Tensile Breaking Strength/Adhesive Force>

A tensile breaking strength is a strength representing a difficulty degree of breaking of the coating film when applying tension thereto. If the tensile breaking strength is insufficiently low, the coating film broke during peeling from the adherend, leading to difficulty in continuing the peeling. On the other hand, if the adhesive force is excessively high, a force necessary to peel the coating film from the adherend becomes large, so that the coating film is more likely to break. Thus, in order to easily peel off the coating film without breaking, the ratio of the tensile breaking strength to the adhesive force has to be sufficiently high.

Further, peel-off of the coating film is performed after using an underwater structure for a given period of time, e.g., 5 years, so that the tensile breaking strength and the adhesive force after the use of the underwater structure need to have desired values for facilitating the peel-off. Therefore, the coating film according to the present invention is characterized in that the ratio of the tensile breaking strength to the adhesive force, as measured after immersing the coating film in pure water at 60° C. for 5 weeks, is 1.5 or more. The temperature 60° C. is greater than an ordinary temperature of water in the nature such as river, sea or lake, so that a state similar to a state after long periods of use of the underwater structure can be created by an aging effect even if a time period of the immersion is less than the given time period before the peel-off of the coating film. For example, immersing the coating film for 5 weeks in pure water at 60° C. is equivalent to immersing the coating film for 5 years in pure water at 23° C. In regard to the coating film according to the present invention or the coating film formed by the method according to the present invention, the ratio of the tensile breaking strength (N/20 mm) of the coating film to the adhesive force (N/20 mm) of the coating film with respect to the underwater structure, as measured after immersing the coating film in pure water at 60° C. for 5 weeks, is 1.5 or more, preferably 3.0 or more, more preferably 5.0 or more. Here, pure water and seawater are the same in terms of influence on the coating film. Thus, as long as the coating film is practically usable in pure water, it can also be used in seawater. Further, in regard to the set of coating materials according to the present invention, in a case where the set of coating materials is used to form a coating film comprising an undercoat layer and an antifouling layer, wherein, as a typical thickness of the coating film, the thickness of the undercoat layer is set to 150 μm, and the thickness of the antifouling layer is set to 100 μm, the ratio of the tensile breaking strength (N/20 mm) of the coating film to the adhesive force (N/20 mm) of the coating film with respect to PMMA, as measured after immersing the coating film in pure water at 60° C. for 5 weeks, is 1.5 or more, preferably 3.0 or more, more preferably 5.0 or more. In regard to the undercoat layer-forming coating material according to the present invention, in a case where the undercoat layer-forming coating material is used to form an undercoat layer comprised in a coating film, wherein the coating film further comprises an antifouling layer made of a silicone resin (and containing silicone oil in an amount of 90 weight parts with respect to 100 weight parts of the silicone resin), and wherein the undercoat layer has a thickness of 150 μm, and the antifouling layer has a thickness of, e.g., 100 μm, the ratio of the tensile breaking strength (N/20 mm) of the coating film to the adhesive force (N/20 mm) of the coating film with respect to PMMA, as measured after immersing the coating film in pure water at 60° C. for 5 weeks, is 1.5 or more, preferably 3.0 or more, more preferably 5.0 or more. Thus, the coating film according to the present invention or the coating film formed using the set of coating materials or the undercoat layer-forming coating material according to the present invention can be easily peeled off even after long periods of use of the underwater structure in an actual underwater environment.

If the adhesive force is excessively low, the coating film is likely to naturally peel. Thus, the adhesive force is preferably set to 3.0 or more, more preferably 4.0 or more. On the other hand, if the adhesive force is excessively high, an excessive force is necessary for peeling the coating film. Thus, the adhesive force is preferably set to 30 or less, more preferably 15 or less.

<Cross-Cut Stretching-Caused Peeling Degree>

Figure 3:
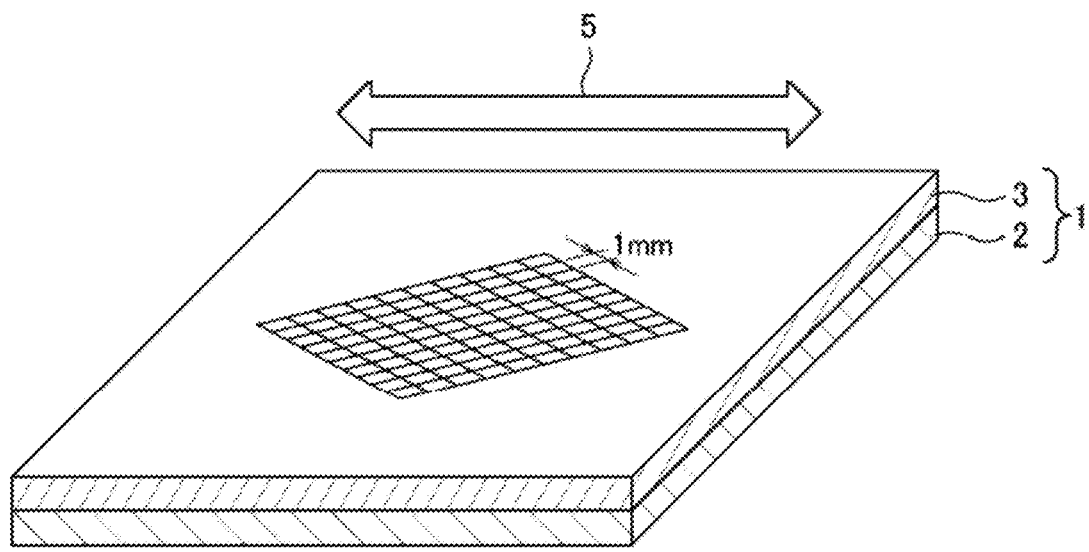
FIG. 3 is a schematic sectional view for explaining the technical meaning of a 1-mm square cross-cut stretching-caused peeling degree.

The 1-mm square cross-cut stretching-caused peeling degree of the antifouling layer with respect to the undercoat layer is measured using a laminate (of the undercoat layer and the antifouling layer) having a plurality of cells formed in only the antifouling layer as 1-mm square cross-cuts, as depicted in FIG. 3, and represents a rate of cells peeled off when stretching the laminate along a diagonal line of the cells (in a direction indicated by the arrowed line 5 in FIG. 3) at a stretching ratio of 2, i.e., represents a difficulty degree of peeling of the antifouling layer from the undercoat layer.

In regard to the coating film according to the present invention or the coating film formed by the method according to the present invention, the 1-mm square cross-cut stretching-caused peeling degree of the antifouling layer with respect to the undercoat layer is 0.05 or less, preferably 0.04 or less, more preferably 0.03 or less, further preferably 0.01 or less, most preferably 0.00. In regard to the set of coating materials according to the present invention, in the case where the set of coating materials is used to form a coating film comprising an undercoat layer and an antifouling layer, wherein, as a typical thickness of the coating film, the thickness of the undercoat layer is set to 150 μm, and the thickness of the antifouling layer is set to 100 μm, the 1-mm square cross-cut stretching-caused peeling degree in this coating film is 0.05 or less, preferably 0.04 or less, more preferably 0.03 or less, further preferably 0.01 or less, most preferably 0.00. In regard to the undercoat layer-forming coating material according to the present invention, in the case where the undercoat layer-forming coating material is used to form an undercoat layer comprised in a coating film, wherein the coating film further comprises an antifouling layer made of a silicone resin (and containing silicone oil in an amount of 90 weight parts with respect to 100 weight parts of the silicone resin), and wherein the undercoat layer has a thickness of 150 μm, and the antifouling layer has a thickness of, e.g., 100 μm, the 1-mm square cross-cut stretching-caused peeling degree in this coating film is 0.05 or less, preferably 0.04 or less, more preferably 0.03 or less, further preferably 0.01 or less, most preferably 0.00. The 1-mm square cross-cut stretching-caused peeling degree of the antifouling layer with respect to the undercoat layer represents adhesiveness (adherence property) of the antifouling layer. Thus, the coating film having such a small value of the 1-mm square cross-cut stretching-caused peeling degree brings out an advantageous effect that the antifouling layer is less likely to be peeled from the undercoat layer.

<Underwater Structure>

Examples of a typical material for use in forming the surface of the underwater structure include PMMA (poly (methyl methacrylate) resin), gel coat (acrylic-based polymer/polystyrene, etc.), epoxy paint, enamel paint (acrylic-based polymer, etc.), and aluminum. Alternatively, in the present invention, other material may be used.

<Undercoat Layer-Forming Coating Material>

The undercoat layer-forming coating material comprises a resin component and a solvent. As the resin component, it is possible to use an elastomer such as rubber (thermosetting elastomer) or a thermoplastic elastomer. However, some thermoplastic elastomers which tend to undergo severe strength degradation due to long-term use, such as polyvinyl chloride, are undesirable, because they are likely to e break during peel-off of the coating film.

As the rubber, it is possible to use, e.g., acrylic rubber, diene-based rubber, butyl rubber, nitrile rubber, hydrogenated nitrile rubber, fluororubber, silicone rubber, ethylene-propylene rubber, chloroprene rubber, urethane rubber, or epichlorohydrin rubber. Among them, it is particularly preferable to use acrylic rubber or diene-based rubber. As the diene-based rubber, it is possible to use natural rubber, isoprene rubber, butadiene rubber, styrene-butadiene rubber, chloroprene rubber, or acrylonitrile-butadiene rubber. Among them, it is preferable to use styrene-butadiene rubber.

As the thermoplastic elastomer, it is possible to use a monovinyl-substituted aromatic compound-based thermoplastic elastomer such as an acrylic-based thermoplastic elastomer or a styrene-based thermoplastic elastomer.

Examples of the acrylic-based thermoplastic elastomer include a block copolymer of PMMA (poly(methyl methacrylate)) and acrylic acid alkyl ester. Examples of the acrylic acid alkyl ester include butyl acrylate, 2-ethylhexyl acrylate, and octyl acrylate. In this block copolymer, the rate of the PMMA as a hard segment can be changed to adjust the constant load peeling degree and the rate of the tensile breaking strength to the adhesive force to fall within the respective ranges defined in the present invention. Specifically, when the content rate of the PMMA is increased, the tensile breaking strength tends to increase, and each of the adhesive force and the constant load peeling degree tends to decrease.

As the styrene-based thermoplastic elastomer, it is possible to use, e.g., SBS (styrene-butadiene-styrene block copolymer), SS (styrene-isoprene-styrene block copolymer), SEBS (styrene-ethylene-butylene-styrene block copolymer), SEPS (styrene-ethylene-propylene-styrene block copolymer), or SEEPS (styrene-ethylene-ethylene-propylene-styrene block copolymer).

In a case where the resin component is the styrene-based thermoplastic elastomer, the content rate of styrene in the resin component can be adjusted to adjust the tensile breaking strength and the adhesive force. The styrene content rate is preferably 20 weight % to 40 weight %, more preferably 22 weight % to 35 weight %, further preferably 25 weight % to 33 weight %.

Further, for the purpose of improving adhesion with respect to the antifouling layer, the elastomer may be modified by a compound containing a polar group. Examples of the polar group include a hydroxyl group, a carboxyl group, an alkoxyl group, an acid anhydride group such as maleic anhydride, and an amino group. The content of the polar group-containing compound in the elastomer is preferably 0.1 weight % to 20 weight %, more preferably 0.3 weight % to 15 weight %, further preferably 0.5 weight % to 5 weight %.

Alternatively, for the same purpose, the undercoat layer-forming coating material may contain a compound containing a polar group. Examples of this compound include a resin containing the polar group, a silane coupling agent, and silicone oil. Examples of the polar group-containing resin include an ionomer, a rosin resin, and a silicone resin. The content of this compound with respect to the resin component in the undercoat layer-forming coating material is preferably 5 weight % to 95 weight %, more preferably 10 weight % to 90 weight %, further preferably 15 weight % to 80 weight %, particularly preferably 20 weight % to 70 weight %.

The content rate of the resin component in the undercoat layer-forming coating material is preferably 5 weight % to 95 weight %, more preferably 10 weight % to 90 weight %, further preferably 15 weight % to 80 weight %, particularly preferably 20 weight % to 70 weight %, most preferably 25 weight % to 60 weight %.

As the solvent, it is possible to use, e.g.; any of various aromatic hydrocarbons such as benzene, toluene, xylene, ethyl benzene, and trimethylbenzene; any of various aliphatic hydrocarbons such as hexane and heptane; any of various esters such as ethyl acetate and vinyl acetate; any of various ethers such as dioxane and diethyl ether; any of various alcohols such as ethanol, isopropanol, and n-butanol; any of various ketones such as acetone, diethyl ketone, and methyl isobutyl ketone; and water.

The above solvents may be used independently or in combination of two or more of them.

The content rate of the solvent is preferably 5 weight % to 95 weight %, more preferably 10 weight % to 90 weight %, further preferably 20 weight % to 85 weight %, particularly preferably 30 weight % to 80 weight %, most preferably 40 weight % to 75 weight %.

In a case where the antifouling layer is formed of the aftermentioned silicone-based coating material, it is preferable to use, as the undercoat layer-forming coating material, a styrene-based thermoplastic elastomer in which 0.1 weight % to 20 weight % thereof is modified by the polar group-containing compound, in view of improving adhesion between the antifouling layer and the undercoat layer. In this case, the styrene content may be set in the range of 20 weight % to 40 weight %.

As the antifouling layer-forming coating material, it is possible to use a silicone-based coating material, a copper-based coating material, or a zinc-based coating material. Among them, it is preferable to use a coating material designed without assumption of recoating, such as the silicone-based coating material.

The silicone-based coating material contains organopolysiloxane as a base polymer. The organopolysiloxane has a curing reactive group, so that an antifouling layer formed using the silicone-based coating material contains a silicone resin as a reaction product of the organopolysiloxane. As the curing reactive group, it is possible to use a hydroxyl group, an alkoxyl group having a carbon number of 1 to 8, a vinyl group, or a (meth) acrylic group. Further, as a hydrolyzable group other than the hydroxyl group, it is possible to use, e.g.; an alkoxy group such as a methoxy group, an ethoxy group, or a propoxy group; an alkoxyalkoxy group such as a methoxyethoxy group, an ethoxyethoxy group, or a methoxypropoxy group; an acyloxy group such as an acetoxy group, an octanoyloxy group, or a benzoyloxy group; an alkenyloxy group such as a vinyloxy group, an isopropenyl group, or a 1-ethyl-2-methylvinyl group; a ketoxime group such as a dimethyl ketoxime group, a methyl ethyl ketoxime group, or a diethyl ketoxime group; an amino group such as a dimethylamino group, a diethylamino group, a butylamino group, or a cyclohexylamino group; an aminoxy group such as a dimethylaminoxy group, or a diethylaminoxy group; or an amide group such as an N-methylacetamide group, an N-ethylacetamide group, or an N-methylbenzamide group.

Preferably, the silicone-based coating material further comprises silicone oil. As the silicone oil, it is possible to use: dimethyl silicone oil in which all groups are methyl groups; methylphenyl silicone oil obtained by substituting a part of the methyl groups of the dimethyl silicone oil with a phenyl group; amino-modified silicone oil obtained by substituting a part of the methyl groups of the dimethyl silicone oil with a monoamine, diamine or aminopolyether group; epoxy-modified silicone oil obtained by substituting a part of the methyl groups of the dimethyl silicone oil with an epoxy, alicyclic epoxy, epoxy polyether or epoxy aralkyl group; carbinol-modified silicone oil obtained by substituting a part of the methyl groups of the dimethyl silicone oil with a carbinol group; mercapto-modified silicone oil obtained by substituting a part of the methyl groups of the dimethyl silicone oil with a mercapto group; carboxyl-modified silicone oil obtained by substituting a part of the methyl groups of the dimethyl silicone oil with a carboxyl group; methacryl-modified silicone oil obtained by substituting a part of the methyl groups of the dimethyl silicone oil with a methacryl group; polyether-modified silicone oil obtained by substituting a part of the methyl groups of the dimethyl silicone oil with a polyether group; long-chain alkyl-modified silicone oil obtained by substituting a part of the methyl groups of the dimethyl silicone oil with a long-chain alkyl or alkyl aralkyl group; higher fatty acid-modified silicone oil obtained by substituting a part of the methyl groups of the dimethyl silicone oil with a higher fatty acid ester group; or fluoroalkyl-modified silicone oil obtained by substituting a part of the methyl groups of the dimethyl silicone oil with a fluoroalkyl group. Further, the methylphenyl silicone oil, the polyether-modified silicone oil, or the long-chain alkyl-modified silicone oil may be used. The above silicone oils may be used independently or in combination of two or more of them.

An adhesive can be contained in the undercoat layer-forming coating material to adjust the adhesive force. As the adhesive, it is possible to use, e.g., a styrene-based tackifier resin, a terpene-based tackifier resin, a rosin-based tackifier resin, an alicyclic saturated hydrocarbon-based tackifier resin, or an acrylic-based tackifier resin. However, any adhesive other than the above may be mixed depending on properties of the undercoat layer-forming coating material.

With regard to the content rate of the silicone resin in the antifouling layer, any suitable content rate may be adopted depending on the content rate of the remaining components such as an antifoulant. For example, it may be set in the range of 30 weight % to 98 weight %, more preferably 35 weight % to 90 weight %, further preferably 40 weight % to 80 weight %.

The content of the silicone oil with respect to 100 weight parts of the silicone resin is preferably from 1 weight part to 150 weight parts, more preferably from 40 weight parts to 140 weight parts. By adjusting the content of the silicone oil with respect to 100 weight parts of the silicone resin to fall within the above range, it is possible to more sufficiently develop an antifouling effect of the antifouling layer, and more sufficiently develop appearance properties and mechanical properties of the antifouling layer.

The copper-based coating material is a coating material containing a copper-based compound. As the copper-based coating material, it is possible to use, e.g.: copper oxide such as cuprous oxide or cupric oxide; a copper alloy such as a copper-nickel alloy; any of various copper salts such as copper thiocyanate or copper sulfide; or an organic metal compound such as pyrithione copper or copper acetate. As the zinc-based coating material, it is possible to use a coating material containing zinc oxide as an antifoulant.

The antifouling layer may contain any suitable additional additive as long as it does not spoil the advantageous effects of the present invention. Examples of the additional additive include an ultraviolet absorbing agent as anti-weathering agent.

Although the coating film according to the above embodiment is formed on the underwater structure, it may be formed on a structure other than the underwater structure. For example, the coating film may be formed on a surface of any of various exterior members such as a roof and an external wall. In this case, as the index representing the difficulty degree of peeling of the coating film from the adherend during use, an adhesive force of the coating film with respect to PMMA is used, instead of the 100-gram underwater constant load peeling degree. In regard to the coating film according to the present invention or the coating film formed by the method according to the present invention, the adhesive force of the coating film with respect to PMMA is preferably 0.5 (N/20 mm) or less, more preferably 0.3 or less, further preferably 0.2 or less, much further preferably 0.1 or less, most preferably 0.0. Further, in this embodiment, other properties, i.e., the ratio of the tensile breaking strength (N/20 mm) to the adhesive force (N/20 mm), and the 1-mm square cross-cut stretching-caused peeling degree of the layer of the antifouling layer-forming coating material with respect to the layer of the undercoat layer-forming coating material, are the same as those of the coating material for forming the coating film on the underwater structure.

EXAMPLES

Coating films formed using respective coating materials in Inventive Examples and Comparative Examples were subjected to the following tests. Table 1 presents a resin component of the undercoat layer in each of Inventive Examples and Comparative Examples. Further, Table 2 presents test results of each of Inventive Examples and Comparative Examples.

Inventive Example 1

(Production of Undercoat Layer-Forming Coating Material)
80 weight parts of amine-modified hydrogenated styrene-based thermoplastic elastomer (trade name "Tuftec MP10", manufacturer: Asahi Kasei Chemicals Corporation, styrene content rate: 30 weight parts) was mixed with 20 weight parts of toluene, and the resulting mixture was steered at room temperature (23° C.) for 12 hours to obtain an undercoat layer-forming coating material.
(Production of Antifouling Layer-Forming Coating Material)
10 weight Parts of silicone resin (trade name "KE445B", manufacturer: Shin-Etsu Silicone Co. Ltd.) was mixed with 90 weight parts of silicone oil (methyl phenyl silicone oil, product name "KF50-100Cs", manufacturer: Shin-Etsu Silicone Co. Ltd.), and the resulting mixture was steered at room temperature (23° C.) for 5 minutes to obtain an antifouling layer-forming coating material.
(Method of Measuring 100-Gram Underwater Constant Load Peeling Degree)
A coating film was produced by the following method, using a set of coating materials consisting of the above undercoat layer-forming coating material and antifouling layer-forming coating material, and subjected to measurement of the 100-gram underwater constant load peeling degree. The undercoat layer-forming coating material was coatingly applied onto a PMMA plate (trade name "Deraglass", manufacturer: ASAHIKASEI TECHNOPLUS Corporation, methyl methacrylate polymer: 96.6% or more) by an applicator, and dried at room temperature for 12 hours to form an undercoat layer having a thickness of 150 μm. The antifouling layer-forming coating material was coatingly applied onto the formed undercoat layer by an applicator, and dried at room temperature for 12 hours to form an antifouling layer having a thickness of 100 μm. In this way, a coating film consisting of the undercoat layer and the antifouling layer was formed on the PMMA plate.

Subsequently, the coating film was trimmed to have a size of 20 mm×100 mm. Then, with respect to the PMMA plate, the trimmed coating film was peeled from the side of one short side (having a length of 20 mm) thereof by a length of 20 mm, and folded back by 180°, and the short side was attached to an end of a PET film (trade name "Lumirror S10", manufacturer: Toray Industries, Inc., thickness: 75

μm), such that a contact area therebetween became 20 mm×20 mm. A weight member having a weight adjusted to become 100 g under water was attached to the PET film to prepare a test sample. A tank filled with pure water at 23° C. was prepared. Then, the sample was immersed in the pure water such that a peel angle of the sample becomes 180 degrees, and a distance [mm] over which the coating film is peeled from the PMMA plate in one hour was measured.
(Method of Measuring Adhesive Force)

The coating film (laminate) consisting of the 150 μm-thick undercoat layer and the 100 μm-thick antifouling layer was formed on the PMMA plate (trade name "Deraglass", manufacturer: ASAHIKASEI TECHNOPLUS Corporation, methyl methacrylate polymer: 96.6% or more), through the same operation as that in the above underwater constant load peel test. After immersing the formed coating film in pure water at 60° C. for 5 weeks, the resulting coating film was trimmed to have a size of 20 mm×100 mm. A force measured when peeling the laminate from the PMMA plate at a peel angle of 180 degrees and at a peel rate of 300 mm/min, using a tensile tester (AUTOGRAPH AGS-X, manufacturer: Shimadzu Corporation) was defined as the adhesive force.
(Method of Measuring Tensile Breaking Strength)

The undercoat layer-forming coating material was coatingly applied to a surface of a separator (trade name "MRF38", manufacturer: Mitsubishi Plastics, Inc., thickness: 50 μm) by an applicator, and dried at room temperature for 12 hours to form an undercoat layer having a thickness of 150 μm. The antifouling layer-forming coating material was coatingly applied onto the formed undercoat layer by an applicator, and dried at room temperature for 12 hours to form an antifouling layer having a thickness of 100 μm. In this way, a coating film composed of a laminate of the undercoat layer and the antifouling layer was formed on the separator. After immersing the obtained laminate of the undercoat layer and the antifouling layer in pure water at 60° C. for 5 weeks, the resulting laminate was trimmed to have a size of 20 mm×100 mm, and the tensile breaking strength of the trimmed laminate was evaluated, using a tensile tester (device name "AUTOGRAPH AGS-X", manufacturer: Shimadzu Corporation).
(Method of Measuring 1-mm Square Cross-Cut Stretching-Caused Peeling Degree)

The coating film consisting of the undercoat layer and the antifouling layer was formed on a separator (trade name "MRF38", manufacturer: Mitsubishi Plastics, Inc., thickness: 38 μm) through the same operation as that for the tensile breaking strength. The obtained laminate of the undercoat layer and the antifouling layer was cut into 20 mm×100 mm, and only the antifouling layer was slit by a cutter, using a cross-cut test cutter guide (trade name "Super Cutter Guide", manufacturer: Taiyu Kizai Ltd.), to form 100 cells (cross-cuts) (each 1 cm □) at intervals of mm. Then, the laminate was stretched along a diagonal line of the cells at a stretching ratio of 2, and the number of ones of the cells peeled from the undercoat layer was counted.
(15-knot Water Flow Test (Undercoat Layer))

Figure 4:
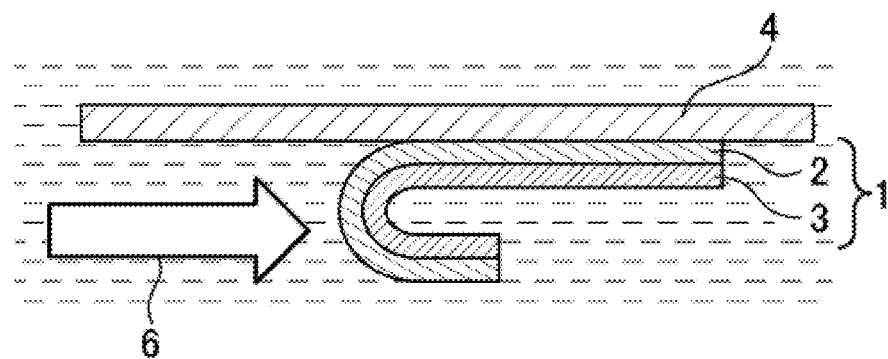
FIG. 4 is a schematic sectional view for explaining a 30-knot water flow test for an undercoat layer.

FIG. 4 is a schematic diagram for explaining a 15-knot water flow test for the undercoat layer. The coating film (laminate) consisting of the 150 μm-thick undercoat layer and the 100 μm-thick antifouling layer was formed on the PMMA plate (trade name "Deraglass", manufacturer: ASAHIKASEI TECHNOPLUS Corporation, methyl methacrylate polymer: 96.6% or more), through the same operation as that in the above underwater constant load peel test, and an outer peripheral portion thereof was removed to allow the resulting coating film to have a size of 20 mm×100 mm. Subsequently, the coating film was peeled from the side of one short side (having a length of 20 mm) thereof by a length of 20 mm. Then, a water flow (flow speed: 15 knots) was supplied in a direction (indicated by the arrowed line 6 in FIG. 4) parallel to a direction along a long side of the coating film for 200 hours, and a time period before peel-off of the undercoat layer from the PMMA plate was evaluated. Here, the direction of the water flow was set such that the peeled short side of the coating film is located on an upstream side of the water flow with respect to the other short side.
(15-knot Water Flow Test (Antifouling Layer))

Figure 5:
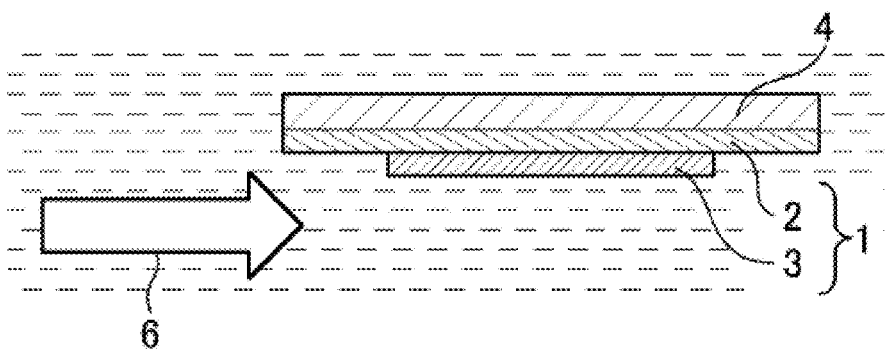
FIG. 5 is a schematic sectional view for explaining a 30-knot water flow test for an antifouling layer.

FIG. 5 is a schematic diagram for explaining a 15-knot water flow test for the antifouling layer. The undercoat layer-forming coating material (1) was coatingly applied onto a PMMA plate (trade name "Deraglass", manufacturer: ASAHIKASEI TECHNOPLUS Corporation, methyl methacrylate polymer: 96.6% or more) by an applicator, and dried at room temperature for 12 hours to form an undercoat layer having a thickness of 150 μm. The antifouling layer-forming coating material (1) was coatingly applied onto the formed undercoat layer by an applicator, and dried at room temperature for 12 hours to form a coating film consisting of the undercoat layer and the antifouling layer on the PMMA plate. A water flow (flow speed: 15 knots) was supplied in a direction (indicated by the arrowed line 6 in FIG. 5) parallel to a direction along a long side of the antifouling layer for 200 hours, and a time period before peel-off of the antifouling layer from the undercoat layer was evaluated.
(30-knot Water Flow Test (Undercoat Layer))

Except that the flow speed of the water flow was changed to 30 knots, the same operation as that in the above 15-knot water flow test (undercoat layer) was performed, and the time period before peel-off of the undercoat layer from the PMMA plate was evaluated.
(30-knot Water Flow Test (Antifouling Layer))

Except that the flow speed of the water flow was changed to 30 knots, the same operation as that in the above 15-knot water flow test (antifouling layer) was performed, and the time period before peel-off of the antifouling layer from the undercoat layer was evaluated.
(Peelability)

FIG. 6 is a schematic diagram for explaining a verification test about peelability. The coating film (laminate) consisting of the 150 μm-thick undercoat layer and the 100 μm-thick antifouling layer was formed on the PMMA plate (trade name "Deraglass", manufacturer: ASAHIKASEI TECHNOPLUS Corporation, methyl methacrylate polymer: 96.6% or more), through the same operation as that in the above underwater constant load peel test. After immersing the obtained laminate of the undercoat layer and the antifouling layer, in pure water at 60° C. for 5 weeks, the resulting laminate was trimmed to have a size of 20 mm×100 mm. It was evaluated whether the undercoat layer breaks when peeling the coating film from the PMMA plate at a peel angle of 145 to 180° (in a direction indicated by the arrowed line 7 in FIG. 7).
(Antifouling Property)

The coating film (laminate) consisting of the 150 μm-thick undercoat layer and the 100 μm-thick antifouling layer was formed on the PMMA plate (trade name "Deraglass", manufacturer: ASAHIKASEI TECHNOPLUS Corporation, methyl methacrylate polymer: 96.6% or more), through the same operation as that in the above underwater constant load peel test. The formed coating film was immersed in seawater along the coast of Himeji city, Hyogo, Japan, at a depth of 1 m. Then, it was evaluated whether aquatic organisms adhere to the surface of the antifouling layer, after immersion for 36 months. Considering that, in all Inventive Examples, the antifouling layer is made of the same material, a test about an antifouling property was performed only in Inventive Example.

In Inventive Example 1, the 100-gram underwater constant load peeling degree, the ratio of the tensile breaking strength to the adhesive force, and the 1-mm square cross-cut stretching-caused peeling degree, were, respectively, 0.0, 19.9 and 0.0. Thus, in the 15-knot and 30-knot water flow tests, no peeling occurred in either of the undercoat layer and the antifouling layer, and, in the peelability test, the coating film could be peeled off without breaking. Therefore, the coating film in Inventive Example 1 brings out an advantageous effect that it is less likely to peel when used on an underwater structure, and is capable of being easily peeled off during maintenance of the underwater structure. Further, with regard to the antifouling property, it was confirmed that no aquatic organism adhered to the surface of the coating film.

Inventive Example 2

Except that the resin composition of the undercoat layer-forming coating material was changed to maleic acid-modified SEBS (trade name "FG1901", manufacturer: Kraton Polymers Japan Ltd., styrene content rate: 30 weight %) which is different from the resin in Inventive Example 1 in terms of modification method, an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 2, the 100-gram underwater constant load peeling degree and the 1-mm square cross-cut stretching-caused peeling degree were, respectively, 0.0, and 0.0, as with Inventive Example 1. Thus, in the 15-knot and 30-knot water flow tests, no peeling occurred in either of the undercoat layer and the antifouling layer. Further, although the ratio of the tensile breaking strength to the adhesive force is 14.0, the coating film could be peeled off from the adherend without breaking of the coating film in the peelability test, i.e., it could be verified that the coating film in Inventive Example 2 brings out the advantageous effect of the present invention. Further, it could be verified that the present invention can be effectively implemented even if the polar group of the compound for use in modification is changed to maleic acid.

Inventive Example 3

Except that the resin composition of the undercoat layer-forming coating material was changed such that a styrene-based tackifier resin (trade name "Piccolastic A75", manufacturer: NN chemical Ltd.) was added in an amount of 35 weight % to the resin in Inventive Example 2 to provide an improved adhesive force, an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 3, the 100-gram underwater constant load peeling degree and the 1-mm square cross-cut stretching-caused peeling degree were, respectively, 0.0, and 0.0, as with Inventive Example 1, so that, in the 15-knot and 30-knot water flow tests, no peeling occurred in either of the undercoat layer and the antifouling layer. Further, although the coating film in Inventive Example 3 has a relatively high adhesive force, and thereby the ratio of the tensile breaking strength to the adhesive force is 1.9, the coating film could be peeled off from the adherend without breaking of the coating film in the peelability test, i.e., it could be verified that the coating film in Inventive Example 3 brings out the advantageous effect of the present invention. Further, it could be verified that the present invention can be effectively implemented by adjusting the adhesive force when needed in some Inventive Examples.

Inventive Example 4

Except that the resin composition of the undercoat layer-forming coating material was changed to hydroxyl group-modified SEBS (trade name "HG252", manufacturer: KURARAY Co., Ltd., styrene content: 28 weight %) which is different from the resin in Inventive Example 1 in terms of modification method, an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 4, the 100-gram underwater constant load peeling degree and the 1-mm square cross-cut stretching-caused peeling degree were, respectively. 0.0, and 0.0, as with Inventive Example 1, so that, in the 15-knot and 30-knot water flow tests, no peeling occurred in either of the undercoat layer and the antifouling layer. Further, in Inventive Example 4, the ratio of the tensile breaking strength to the adhesive force is 21.4, so that the coating film could be peeled off from the adherend without breaking of the coating film in the peelability test, i.e., it could be verified that the coating film in Inventive Example 4 brings out the advantageous effect of the present invention. Inventive Example 4 shows that the present invention can be effectively implemented even if the resin is changed to a different SEPS, i.e., a different styrene-based thermoplastic elastomer, and the polar group of the compound for use in modification is changed to hydroxyl group.

Inventive Example 5

Except that the resin composition of the undercoat layer-forming coating material was changed to modified SEBS (trade name "DYNARON 8660P", manufacturer: JSR Corporation) whose styrene content is 25 weight % which is less than that of the resin in Inventive Example 1, an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 5, the 100-gram underwater constant load peeling degree and the 1-mm square cross-cut stretching-caused peeling degree were, respectively, 0.0, and 0.0, as with Inventive Example 1, so that, in the 15-knot and 30-knot water flow tests, no peeling occurred in either of the undercoat layer and the antifouling layer. Further, although the ratio of the tensile breaking strength to the adhesive force in Inventive Example 5 is 6.0, the coating film could be peeled off from the adherend without breaking of the coating film in the peelability test, i.e., it could be verified that the coating film in Inventive Example 5 brings out the advantageous effect of the present invention. Inventive Example 5 also shows that the present invention can be effectively implemented by adjusting the styrene content to adjust properties of a coating film.

Inventive Example 6

Except that the resin composition of the undercoat layer-forming coating material was changed to an acrylic-based thermoplastic elastomer (PMMA/2-ethylhexyl acrylate-butyl acrylate block copolymer, trade name "KURARITY LK9333", manufacturer: KURARAY Co., Ltd.), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 6, the 100-gram underwater constant load peeling degree and the 1-mm square cross-cut stretching-caused peeling degree were, respectively, 0.0, and 0.0, as with Inventive Example 1, so that, in the 15-knot and 30-knot water flow tests, no peeling occurred in either of the undercoat layer and the antifouling layer. Further, although the ratio of the tensile breaking strength to the adhesive force in Inventive Example 6 is 1.8, the coating film could be peeled off from the adherend without breaking of the coating film in the peelability test, i.e., it could be verified that the coating film in Inventive Example 6 brings out the advantageous effect of the present invention. Inventive Example 6 shows that the present invention can be effectively implemented even if the resin is an acrylic-based thermoplastic elastomer.

Inventive Example 7

Except that the resin composition of the undercoat layer-forming coating material was changed to SEBS obtained by changing the styrene content of the SEBS in Inventive Example 2 from 30 weight % to 13 weight % (trade name "GFG1924", manufacturer: Kraton Polymers Japan Ltd., styrene content: 13 weight %, maleic acid-modified amount: 1 wt %), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 7, the styrene content of the SEBS of the undercoat layer is as low as 13 weight %, and thereby the tensile breaking strength is as low as 24. However, the adhesive force is also relatively low, and thereby the ratio of the tensile breaking strength to the adhesive force is 4.9, so that, in the peelability test, the coating film could be peeled off from the adherend without breaking of the coating film. Further, the SEBS is subjected to modification treatment to provide relatively high adhesion between the undercoat layer and the antifouling layer, and thereby the 1-mm square cross-cut stretching-caused peeling degree is 0.00, so that no peeling occurred in the antifouling layer. Further, the 100-gram underwater constant load peeling degree is as slightly high as 3, so that, in the 30-knot water flow test, peeling occurred in the undercoat layer. However, in the 15-knot water flow test, no peeling occurred in the undercoat layer. Thus, it could be verified that, even if the undercoat layer is made of SEBS whose styrene content is as low as 13 weight %, a resulting coating film has practicality, i.e., the present invention can be effectively implemented.

Inventive Example 8

Except that the resin composition of the undercoat layer-forming coating material was changed to urethane emulsion (trade name "HYDRAN WLS210", manufacturer: DIC Corporation), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 8, the 100-gram underwater constant load peeling degree and the 1-mm square cross-cut stretching-caused peeling degree were, respectively, 0.0, and 0.0, as with Inventive Example 1, so that, in the 15-knot and 30-knot water flow tests, no peeling occurred in either of the undercoat layer and the antifouling layer. Further, although the ratio of the tensile breaking strength to the adhesive force in Inventive Example 8 was 3.66, the coating film could be peeled off from the adherend without breaking of the coating film in the peelability test, i.e., it could be verified that the coating film in Inventive Example 8 brings out the advantageous effect of the present invention. Inventive Example 8 shows that the present invention can be effectively implemented even if the resin is a urethane emulsion resin.

Inventive Example 9

Except that the resin composition of the undercoat layer-forming coating material was changed to a mixture obtained by mixing: PIB (polyisobutylene) (trade name "B100", manufacturer: BASF Corporation); tackifier (trade name "Arkon M135", manufacturer: Arakawa Chemical Industries, Ltd.); and amine-modified silicone oligomer (trade name "x-40-2651", manufacturer: Shin-Etsu Chemical Co. Ltd.) at a mixing ratio of 72 (weight %):21 (weight %):7 (weight %), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 9, the ratio of the tensile breaking strength to the adhesive force is 2.9, so that, in the peelability test, the coating film could be peeled off from the adherend without breaking of the coating film. Further, the coating material contains amine-modified silicone oligomer to provide relatively high adhesion between the undercoat layer and the antifouling layer, and thereby the 1-mm square cross-cut stretching-caused peeling degree is 0.00, so that no peeling occurred in the antifouling layer. Further, the 100-gram underwater constant load peeling degree is as slightly high as 4, so that, in the 30-knot water flow test, peeling occurred in the undercoat layer. However, in the 15-knot water flow test, no peeling occurred in the undercoat layer. Thus, it could be verified that, even if the undercoat layer is made of the above mixture, a resulting coating film has practicality, i.e., the present invention can be effectively implemented.

Inventive Example 10

Except that the resin composition of the undercoat layer-forming coating material was changed to a mixture obtained by mixing fluororesin (trade name "GL252EA", manufacturer: DAIKIN INDUSTRIES, Ltd, which contains 5 weight parts of curing agent (GL200RB)), and ionomer (trade name "Chemipearl SA100", manufacturer: Mitsui Chemicals, Inc.) at a mixing ratio of 91 (weight %):9 (weight %), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Inventive Example 10, the 100-gram underwater constant load peeling degree and the 1-mm square cross-cut stretching-caused peeling degree were, respectively, 0.0, and 0.0, as with Inventive Example 1, so that, in the 15-knot and 30-knot water flow tests, no peeling occurred in either of the undercoat layer and the antifouling layer. Further, although the ratio of the tensile breaking strength to the adhesive force in Inventive Example 10 is 1.85, the coating film could be peeled off from the adherend without breaking of the coating film in the peelability test, i.e., it could be verified that the coating film in Inventive Example 5 brings out the advantageous effect of the present invention. Inventive Example 10 also shows that the present invention can be effectively implemented even if even if the undercoat layer is made of the above mixture.

The present invention is not limited to the above materials, but may be appropriately implemented by using any other suitable material satisfying the 100-gram underwater constant load peeling degree, the ratio of the tensile breaking strength to the adhesive force and the 100-gram underwater constant load peeling degree defined in the present invention.

Comparative Example 1

In Comparative Example 1, an undercoat layer-forming coating material and an antifouling layer-forming coating material were produced through the same operation as that in Inventive Example 1, except that the resin composition of the undercoat layer-forming coating material was changed to non-modified SEBS (trade name "Tuftec H1053", manufacturer: Asahi Kasei Chemicals Corporation, styrene content: 29 weight %) which is different from the modified SEBS in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

The styrene content of the SEBS of the undercoat layer in Comparative Example 1 is as high as 29 weight %, and thereby the undercoat layer has a relatively high tensile breaking strength, so that, in the peelability test, the coating film could be peeled off from the adherend without breaking of the coating film. Further, the 100-gram underwater constant load peeling degree is 0.0, so that in the 15-knot and 30-knot water flow tests, no peeling occurred in the undercoat layer. However, the non-modified SEBS has poor adhesion with silicone resin, and thereby the 1-mm square cross-cut stretching-caused peeling degree is 1.00, so that, in the 15-knot and 30-knot water flow tests, peeling occurred in the antifouling layer. The ratio of the tensile breaking strength to the adhesive force is 15.4, so that there was no problem in terms of peelability.

Comparative Example 2

In Comparative Example 2, an undercoat layer-forming coating material and an antifouling layer-forming coating material were produced through the same operation as that in Inventive Example 1, except that the resin composition of the undercoat layer-forming coating material was changed to non-modified SEBS (trade name "Tuftec H1062", manufacturer: Asahi Kasei Chemicals Corporation, styrene content: 18 weight %) which is different from the modified SEBS in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

The styrene content of the SEBS of the undercoat layer in Comparative Example 2 is 18 weight % which is less than that in Comparative Example 1, and thereby the tensile breaking strength is less than that in Comparative Example 1. However, the adhesive force is also relatively low, and thereby the ratio of the tensile breaking strength to the adhesive force is 18.3, so that, in the peelability test, the coating film could be peeled off from the adherend without breaking of the coating film. Further, although the 100-gram underwater constant load peeling degree is 0.2, no peeling occurred in the undercoat layer in the 15-knot and 30-knot water flow tests. However, because the SEBS is not subjected to modification as with Comparative Example 1, it has poor adhesion with silicone resin, and thereby the 1-mm square cross-cut stretching-caused peeling degree is 1.00. Thus, in the 30-knot water flow test, peeling occurred in the antifouling layer. Although Comparative Example 2 is not an embodiment of the present invention because the 1-mm square cross-cut stretching-caused peeling degree is excessively large, it shows that, as long as the 100-gram underwater constant load peeling degree is 0.2 or less, the undercoat layer is not peeled from the adherend in the 15-knot and 30-knot water flow tests.

Comparative Example 3

In Comparative Example 3, an undercoat layer-forming coating material and an antifouling layer-forming coating material were produced through the same operation as that in Inventive Example 1, except that the resin composition of the undercoat layer-forming coating material was changed to non-modified SEBS (trade name "G1657", manufacturer: Kraton Polymers Japan Ltd., styrene content: 13 weight %) which is different from the modified SEBS in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

The styrene content of the SEBS of the undercoat layer in Comparative Example 3 is 13 weight % which is less than that in Comparative Example 2, and thereby the tensile breaking strength is less than that in Comparative Example 2. However, the adhesive force is also relatively low, and thereby the ratio of the tensile breaking strength to the adhesive force is 15.6, so that, in the peelability test, the coating film could be peeled off from the adherend without breaking of the coating film. On the other hand, the 100-gram underwater constant load peeling degree is 8, so that, in the 15-knot and 30-knot water flow tests, peeling occurred in the undercoat layer. Moreover, because the SEBS is not subjected to modification as with Comparative Example 1, it has poor adhesion with the antifouling layer, and thereby the 1-mm square cross-cut stretching-caused peeling degree is 1.00, so that, in the 15-knot and 30-knot water flow tests, peeling occurred in the antifouling layer.

Comparative Example 4

Except that the resin composition of the undercoat layer-forming coating material was changed to a polyvinyl chloride-polyvinyl acetate copolymer (trade name "Solbin CH", manufacturer: Shin-Etsu Chemical Co., Ltd.), and the solvent was changed to MEK (methyl ethyl ketone), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 4, the 100-gram underwater constant load peeling degree is 0.0, so that no peeling occurred in the 15-knot and 30-knot water flow tests. However, because the ratio of the tensile breaking strength to the adhesive force is excessively low, the coating film broke before being completely peeled off in the peelability test. However, Comparative example 4 shows that, even when the 1-mm square cross-cut stretching-caused peeling degree is 0.03, no peeling occurs in the antifouling layer in the 15-knot and 30-knot water flow tests.

Comparative Example 5

Except that the resin composition of the undercoat layer-forming coating material was changed to PVB (polyvinyl butyral) (trade name "B60T", manufacturer: KURARAY Co., Ltd.), and the solvent was changed to ethanol, an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 5, the 100-gram underwater constant load peeling degree is 0.0, so that no peeling occurred in the 15-knot and 30-knot water flow tests. However, because the ratio of the tensile breaking strength to the adhesive force is excessively low, the coating film broke before being completely peeled off in the peelability test. However, Comparative example 5 shows that, even when the 1-mm square cross-cut stretching-caused peeling degree is 0.04, no peeling occurs in the antifouling layer in the 15-knot and 30-knot water flow tests.

Comparative Example 6

Except that the undercoat layer-forming coating material was changed to a commercially-available urethane-based coating material (trade name "Masking Color", manufacturer: TAIYO TORYO Co., Ltd.), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 6 using the urethane-based coating material, in the peelability test, the coating film could be peeled off from the adherend without breaking of the coating film. However, the 100-gram underwater constant load peeling degree is as high as 50. Moreover, adhesion between the undercoat layer and the antifouling layer is relatively low, and thereby the 1-mm square cross-cut stretching-caused peeling degree is 1.00. Thus, in the 15-knot and 30-knot water flow tests, peeling occurred in both the undercoat layer and the antifouling layer.

Comparative Example 7

Except that the undercoat layer-forming coating material was changed to a commercially-available SBR (styrene-butadiene rubber)-based coating material (trade name "1034", manufacturer: Plasti Dip International, Inc.), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 7 using the SBR-based coating material, in the peelability test, the coating film could be peeled off from the adherend without breaking of the coating film. However, adhesion between the undercoat layer and the antifouling layer is relatively low, and thereby the 1-mm square cross-cut stretching-caused peeling degree is 1.00, so that, in the 15-knot and 30-knot water flow tests, peeling occurred in the antifouling layer.

Comparative Example 8

Except that the undercoat layer-forming coating material was changed to a commercially-available SEBS-based coating material (trade name "Liquid Rubber Paint Oil-based", manufacturer: SDesgn), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 8, the 100-gram underwater constant load peeling degree and the 1-mm square cross-cut stretching-caused peeling degree are, respectively, 20 and 1.00 which are excessively high, so that, in the 15-knot and 30-knot water flow tests, peeling occurred in both the undercoat layer and the antifouling layer. Moreover, the ratio of the tensile breaking strength to the adhesive force is as low as 1.1, so that, in the peelability test, the coating film could not peeled off due to breaking.

Comparative Example 9

Except that the resin composition of the undercoat layer-forming coating material was changed to a mixture obtained by mixing the maleic acid-modified SEBS used in Inventive Example 2, and an acrylic-based thermoplastic elastomer (trade name "KURARITY LA2330", manufacturer: KURARAY Co., Ltd.) at a mixing ratio of 50 (weight %):50 (weight %), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 9, the coating film containing the acrylic-based thermoplastic elastomer is improved in the adhesive force. On the other had, the tensile breaking strength is deteriorated and thereby the ratio of the tensile breaking strength to the adhesive force is as low as 1.2, so that, in the peelability test, the coating film broke before being completely peeled off.

Comparative Example 10

Except that the resin composition of the undercoat layer-forming coating material was changed to a mixture obtained by mixing the maleic acid-modified SEBS used in Inventive Example 2, and the acrylic-based thermoplastic elastomer described in Comparative Example 9 at a mixing ratio of 25 (weight %):75 (weight %), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 10, the coating film containing the acrylic-based thermoplastic elastomer at a higher content rate than that in Comparative Example 9 is improved in the tensile breaking strength. However, the adhesive force is also increased and thereby the ratio of the tensile breaking strength to the adhesive force is maintained at 1.2, so that, in the peelability test, the coating film broke before completely peeled off.

Comparative Example 11

Except that the resin composition of the undercoat layer-forming coating material was changed to only the acrylic-based thermoplastic elastomer described in Comparative Example 9, an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 11, the acrylic-based thermoplastic elastomer is different from that in Inventive Example 6. In Comparative Example 11, although the adhesive force becomes higher than that in Inventive Example 6, the tensile breaking strength stays at 24, and thereby the ratio of the tensile breaking strength to the adhesive force is as low as 1.2, so that, in the peelability test, the coating film broke before being completely peeled off.

Comparative Example 12

Except that the resin composition of the undercoat layer-forming coating material was changed to a mixture obtained by mixing butyl rubber (trade name "065", manufacturer: JSR Corporation) and the amine-modified silicone oligomer described in Inventive Example 9 at a mixing ratio of 77 (weight %):23 (weight %), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 12, the coating film containing the amine-modified silicone oligomer is improved in the adhesive force. On the other had, the tensile breaking strength is as low as 1, so that, in the peelability test, the coating film broke before being completely peeled off.

Comparative Example 13

Except that the undercoat layer-forming coating material was changed to a commercially-available primer for silicone (trade name "Primer T", manufacturer: Shin-Etsu Chemical Co. Ltd.), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 13, the commercially-available primer is not designed on the assumption of peeling, so that, in the peelability test, the coating film broke before being completely peeled off.

Comparative Example 14

Except that the undercoat layer-forming coating material was changed to a commercially-available primer for silicone (trade name "Primer No. 4", manufacturer: Shin-Etsu Chemical Co. Ltd.), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 14, the commercially-available primer is not designed on the assumption of peeling, so that, in the peelability test, the coating film broke before being completely peeled off.

Comparative Example 15

Except that the resin composition of the undercoat layer-forming coating material was changed to only ionomer (trade name "Chemipearl SA100", manufacturer: Mitsui Chemicals, Inc.), an undercoat layer-forming coating material and an antifouling layer-forming coating material were produced through the same operation as that in Inventive Example 1. Then, a coating film was produced through the same operation as that in Inventive Example 1, using a set of coating materials consisting of the above coating materials, and subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 15, although the adhesive force is increased, the tensile breaking strength is deteriorated, so that, in the peelability test, the coating film broke before being completely peeled off.

Inventive Example 16

An antifouling layer-forming coating material was produced to form a coating film through the same operation as that in Inventive Example 1, except that the undercoat layer-forming coating material was not used. Then, the coating film was subjected to the underwater constant load peel test, the adhesive force, tensile breaking strength and cross-cut stretch tests, the 15-knot and 30-knot water flow tests (undercoat layer), the 15-knot and 30-knot water flow tests (antifouling layer), and the evaluation of peelability. Their results are presented in Table 2.

In Comparative Example 16, due to lack of the undercoat layer, the adhesive force is almost not exhibited, so that, in the 15-knot and 30-knot water flow tests, peeking occurred in the undercoat layer.

TABLE 1

| | Composition | Mixing Ratio (Wt %) | Trade Name | Manufacturer | Solvent |
|---|---|---|---|---|---|
| Inventive Example 1 | Amine-modified SEBS (styrene content: 30 wt %, amine-modifed amount: 1.8 wt %) | 100 | Tuftec MP-10 | Asahi Kasei Chemicals | Toluene |
| Inventive Example 2 | Maleic acid-modified SEBS (styrene content: 30 wt %, maleic acid-modified amount: 1 wt %) | 100 | FG1901 | Kraton Polymers Japan | Toluene |
| Inventive Example 3 | Maleic acid-modified SEBS (styrene content 30 wt %, maleic acid-modified amount: 1 wt %) | 65 | FG1901 | Kraton Polymers Japan | Toluene |
| | Styrene-based tackifier resin | 35 | Piccolastic A75 | SN Chemical | |
| Inventive Example 4 | Hydroxyl group-modified SEBS (Styrene content 28 w %) | 100 | HG252 | KURARAY | Toluene |
| Inventive Example 5 | Amine-modified SEBS (styrene content: 25 wt %) | 100 | DYNARON 8660P | JSR | Toluene |
| Inventive Example 6 | Acrylic-based thermoplastic elastomer (PMMA/2-ethylhexyl acrylate-butyl acrylate block copolymer) | 100 | KURARITY LK9333 | KURARAY | Toluene |
| Inventive Example 7 | Maleic acid-modified SEBS (styrene content: 13 wt %, maleic acid-modified amount: 1 wt %) | 100 | GFG1924 | Kraton Polymers Japan | Toluene |
| Inventive Example 8 | Urethane emulsion | 100 | HYDRAN WLS 210 | DIC | — |
| Inventive Example 9 | PIB | 72 | B100 | BASF | Toluene |
| | Tackifier | 21 | Arkon M135 | Arakawa Chemical Industries | |
| | amine-modified silicone oligomer | 7 | x-40-2651 | Shin-Etsu Silicone | |
| Inventive Example 10 | Fluororesin | 91 | GL252EA (curing agent GL200RB; 5 parts) | DAIKIN INDUSTRIES | — |
| | Ionomer | 9 | Chemipearl SA100 | Mitsui Chemicals | |
| Inventive Example 11 | Urethane emulsion | 100 | SUPERFLEX 470 | DKS | — |
| Inventive Example 12 | Ionomer-butyl | 100 | None | Lanxess | Toluene |
| Inventive Example 13 | SEBC | 77 | G1652 | Kratori Polymers Japan | Toluene |
| | Rosin resin | 23 | Ponsel D135 | Arakawa Chemical Industries | |
| Inventive Example 14 | SEBC | 95 | G1652 | Kraton Polymers Japan | Toluene |
| | aikoxysiiicone oligomer | 5 | KC-89S | Shin-Etsu Silicone | |
| Inventive Example 15 | SEBC | 77 | G1652 | Kraton Polymers Japan | Toluene |
| | hydrogen-modified silicone oil | 23 | KF990I | Shin-Etsu Silicone | |
| Comparative Example 1 | SEBS (styrene content 29 wt %) | 100 | Tuftec H1053 | Asahi Kasei Chemicals | Toluene |
| Comparative Example 2 | SEBS (styrene content 18 wt %) | 100 | Tuftec H1062 | Asahi Kasei Chemicals | Toluene |
| Comparative Example 3 | SEBS (styrene content 13 wt %) | 100 | G1657 | Kraton Polymers Japan | Toluene |
| Comparative Example 4 | polyvinyl chloride-polyvinyl acetate | 100 | Solbin CH | Shin-Etsu Silicone | MEK |
| Comparative Example 5 | PVB | 100 | 860T | KURARAY | Ethanol |
| Comparative Example 6 | Marketed product (urethane-based) | 100 | Masking Color | TAIYO TORYO | — |
| Comparative Example 7 | Marketed product (SBR-based) | 100 | 1034 | Plasti Dip | — |
| Comparative Example 8 | Marketed product (SEBS-based) | 100 | Liquid Rubber Paint Oil Based | SDesign | — |
| Comparative Example 9 | Maleic acid-modified SEBS (styrene content 30 wt %, maleic acid-modified amount: 1 wt %) | 50 | FG1901 | Kraton Polymers Japan | Toluene |
| | acrylic-based thermoplastic elastomer | 50 | KURARITY LA2330 | KURARAY | |
| Comparative Example 10 | Maleic acid-modified SEBS (styrene content: 30 wt %, maleic acid-modified amount: 1 wt %) | 25 | FG1901 | Kraton Polymers Japan | Toluene |
| | Acrylic-based thermoplastic elastomer (PMMA/butyl-acrylate block copolymer block copolymer) | 75 | KURARITY LA2330 | KURARAY | |
| Comparative Example 11 | Acrylic-based thermoplastic elastomer (PMMA/butyl-acrylate block copolymer block copolymer) | 100 | KURARITY LA2330 | KURARAY | Toluene |

TABLE 1-continued

| | Composition | Resin Mixing Ratio (Wt %) | Trade Name | Manufacturer | Solvent |
|---|---|---|---|---|---|
| Comparative Example 12 | butyl robber amine-modified silicone oligomer | 77 23 | 065 x-40-2651 | JSR Shin-Etsu Silicone | Toluene |
| Comparative Example 13 | Primer for Silicone | 100 | Primer T | — | — |
| Comparative Example 14 | Primer for Silicone | 100 | Primer No. 4 | — | — |
| Comparative Example 15 | Ionomer | 100 | Chemipearl SA100 | Mitsui Chemicals | — |
| Comparative Example 16 | Without undercoat | — | — | — | — |

TABLE 2

| | Underwater Constant Load Peeling Degree mm | Adhesive Force N/20 mm | Tensile Breaking Strength N/20 mm | Tensile Breaking Strength/ Adhesive Force | Cross-Cut Stretch Test |
|---|---|---|---|---|---|
| Inventive Example 1 | 0 | 8.3 | 165 | 19.9 | 0/100 |
| Inventive Example 2 | 0 | 9 | 126 | 14.0 | 0/100 |
| Inventive Example 3 | 0 | 22 | 42 | 1.9 | 0/100 |
| Inventive Example 4 | 0 | 7 | 150 | 21.4 | 0/100 |
| Inventive Example 5 | 0 | 14 | 84 | 6.0 | 0/100 |
| Inventive Example 6 | 0 | 13 | 24 | 1.3 | 0/100 |
| Inventive Example 1 | 3 | 4.9 | 24 | 4.9 | 0/100 |
| Inventive Example 8 | 0 | 150 | 41 | 3.66 | 0/100 |
| Inventive Example 9 | 4 | 17.7 | 6.1 | 2.9 | 0/100 |
| Inventive Example 10 | 0 | 6 | 4.92 | 1.83 | 0/100 |
| Comparative Example 1 | 0 | 7.2 | 111 | 15.4 | 100/100 |
| Comparative Example 2 | 0.2 | 4.1 | 75 | 18.3 | 100/100 |
| Comparative Example 3 | 8 | 2.7 | 42 | 15.6 | 100/100 |
| Comparative Example 4 | 0 | >25 | 6 | <1 | 3/100 |
| Comparative Example 5 | 0 | >25 | 9 | <1 | 4/100 |
| Comparative Example 6 | 50 | 1 | 22.5 | 22.5 | 100/100 |
| Comparative Example 7 | 0 | 5.7 | 39 | 6.8 | 100/100 |
| Comparative Example 8 | 20 | 2.7 | 3 | 1.1 | 100/100 |
| Comparative Example 9 | 0 | 15 | 17.4 | 1.2 | 0/100 |
| Comparative Example 10 | 0 | 18 | 21.3 | 1.2 | 0/100 |
| Comparative Example 11 | 0 | 20 | 24 | 1.2 | 3/100 |
| Comparative Example 12 | 0 | >25 | 1 | <1 | 0/100 |
| Comparative Example 13 | 0 | >25 | inevaluable | — | 0/100 |
| Comparative Example 14 | 0 | >25 | inevaluable | — | 0/100 |
| Comparative Example 15 | 0 | >25 | 15 | <1 | 0/100 |
| Comparative Example 16 | 50 | <1 | 6 | >1.5 | 100/100 |

| | 30-knot Water flow Test | | 15-knot Water Flow Test | | Peelability |
|---|---|---|---|---|---|
| | Undercoat Layer | Antifouling Layer | Undercoat Layer | Antifouling Layer | |
| Inventive Example 1 | No peeling | No peeling | No peeling | No peeling | Peel-off without breaking |
| Inventive Example 2 | No peeling | No peeling | No peeling | No peeling | Peel-off without breaking |
| Inventive Example 3 | No peeling | No peeling | No peeling | No peeling | Peel-off without breaking |
| Inventive Example 4 | No peeling | No peeling | No peeling | No peeling | Peel-off without breaking |
| Inventive Example 5 | No peeling | No peeling | No peeling | No peeling | Peel-off without breaking |
| Inventive Example 6 | No peeling | No peeling | No peeling | No peeling | Peel-off without breaking |
| Inventive Example 7 | Complete peel-off within 24 h | No peeling | No peeling | No peeling | Peel-off without breaking |
| Inventive Example 8 | No peeling | No peeling | No peeling | No peeling | Peel-off without breaking |
| Inventive Example 8 | Complete peel-off within 24 h | No peeling | No peeling | No peeling | Peel-off without breaking |
| Inventive Example 10 | No peeling | No peeling | No peeling | No peeling | Peel-off without breaking |
| Comparative Example 1 | No peeling | Complete peel-off within 1 h | No peeling | Complete peel-off within 8 h | Peel-off without breaking |
| Comparative Example 2 | No peeling | Complete peel-off within 1 h | No peeling | Complete peel-off within 8 h | Peel-off without breaking |
| Comparative Example 3 | Complete peel-off within 10 h | Complete peel-off within 1 h | Complete peel-off within 200 h | Complete peel-off within 8 h | Peel-off without breaking |
| Comparative Example 4 | No peeling | No peeling | No peeling | No peeling | Breaking before peel-off |
| Comparative Exomple 5 | No peeling | No peeling | No peeling | No peeling | Breaking before peel-off |

TABLE 2-continued

| | | | | | |
|---|---|---|---|---|---|
| Comparative Example 6 | Complete peel-off within 1 h | Complete peel-off within 1 h | Complete peel-off within 24 h | Complete peel-off within 8 h | Peel-off without breaking |
| Comparative Example 7 | No peeling | Complete peel-off within 1 h | No peeling | Complete peel-off within 8 h | Peel-off without breaking |
| Comparative Example 8 | Complete peel-off within 4 h | Complete peel-off within 1 h | Complete peel-off within 100 h | Complete peel-off within 8 h | Breaking before peel-off |
| Comparative Example 9 | No peeling | No peeling | No peeling | No peeling | Breaking before peel-off |
| Comparative Example 10 | No peeling | No peeling | No peeling | No peeling | Breaking before peel-off |
| Comparative Example 11 | No peeling | No peeling | No peeling | No peeling | Breaking before peel-off |
| Comparative Example 12 | No peeling | No peeling | No peeling | No peeling | Breaking before peel-off |
| Comparative Example 13 | No peeling | No peeling | No peeling | No peeling | Breaking before peel-off |
| Comparative Example 14 | No peeling | No peeling | No peeling | No peeling | Breaking before peel-off |
| Comparative Example 15 | No peeling | No peeling | No peeling | No peeling | Breaking before peel-off |
| Comparative Example 16 | — | Complete peel-off within 1 h | — | Complete peel-off within 1 h | Peel-off without breaking |

Although the 1-mm square cross-cut stretching-caused peeling degrees in Inventive Example 7 and Inventive Example 9 are, respectively, 3 and 4, no peeling occurs in the 15-knot water flow test. On the other hand, the 1-mm square cross-cut stretching-caused peeling degree in Comparative Example 3 is 8, so that, in the 15-knot water flow test, peeling occurred within 200 hours, although no peeling occurred for relatively long period of time. As mentioned above, an actual water flow is 15 knots or less (normally, no more than about 10 knots). Thus, as long as the 100-gram underwater constant load peeling degree is, e.g., 5 or less, it is possible to ensure durability enough for practical use. A resistance actually receiving from a water flow having a 15-knot flow speed is calculated by the formula 1 as a value equivalent to a constant load of 30 g. Then, considering that, as long as the 100-gram underwater constant load peeling degree is 0.5 mm or less, durability (non-peelability) enough for practical use in an environment receiving a 30-knot water flow is considered to be ensured, it is possible to resist a 15-knot water flow, as long as the 30-gram underwater constant load peeling degree is 0.5 mm or less. Further, using the Eyring equation (see the formula (2)) which represents the relationship between the load (stress) and the peeling time (effective life), it is possible to calculate a condition that the 100-gram underwater constant load peeling degree is less than 5 mm, based on the condition that the 30-gram underwater constant load peeling degree is 0.5 mm or less. For example, in a case where a laminate of an acrylic-based pressure-sensitive adhesive layer (thickness: 50 μm) and a polyethylene terephthalate substrate (thickness: 38 μm), and PPM serving as an adherend, 0.38 (mm/20 mm) as a value of the 30-gram underwater constant load peeling degree of is equivalent to 5.0 (mm/20 mm) as a value of the 100-gram underwater constant load peeling degree (stress). Thus, it is considered that, as long as the 100-gram underwater constant load peeling degree is less than 5.0 (mm/20 mm), the undercoat layer is less likely to peel under water, i.e., an obtained coating film is practicable. Here, the constants c and n in the above Examples are determined based on an experimental result that, in the aforementioned method of measuring the 100-gram underwater constant load peeling degree, the coating film is peeled by 10 mm in a peeling test period of 1.5 hours.

The reason that PMMA is adopted as an, adherend in the above experimental test is that it is difficult to conduct experimental tests regarding all of various adherends, and that a typical material for use in forming a surface of an underwater structure includes gel coat (acrylic-based polymer/polystyrene, etc.), epoxy resin, enamel (acrylic-based polymer, etc.), aluminum, and antifouling paint, wherein PMMA has intermediate properties among these surface-forming materials. Therefore, a coating material or a set of coating materials exhibiting preferred properties when using PMMA as the adherend can be deemed to bring out preferred properties with respect to at least one or more materials for use in forming a surface of an underwater structure. In regards to the above Examples, test results in cases of using other adherends present in Tables 3 to 7. Except that a different adherend was used, each experimental test was performed in the same manner as described above. Table 3 presents test results in case of using gel coat (trade name "White Coat", manufacturer: Kohshin Chemical Co., Ltd.) as the adherend. Table 4 presents test results in case of using a coating film formed from epoxy paint (trade name "SEA-JET03", manufacturer: CHUGOKU MARINE PAINTS, Ltd.) as the adherend. Table 5 presents test results in case of using a coating film formed from enamel paint (trade name "SEAJET15" manufacturer: CHUGOKU MARINE PAINTS, Ltd.) as the adherend. Table 6 presents test results in case of using a coating film formed from antifouling paint enamel (tradename "SEAJET003", manufacturer: CHUGOKU MARINE PAINTS, Ltd.) as the adherend. Table 7 presents test results in case of using aluminum (tradename "A1080", manufacturer: NISHIYAMA-SEI-SAKUSHO Co Ltd. purity of aluminum: 99.5% or more) as the adherend.

TABLE 3

| | Underwater Constant Load Peeling Degree mm | Adhesive Force N/20 mm | Tensile Breaking Strength N/20 mm | Tensile Breaking Strength/ Adhesive Force | Cross-Cut Stretch Test |
|---|---|---|---|---|---|
| Inventive Example 1 | 0 | 10 | 165 | 16.5 | 0/100 |
| Inventive Example 2 | 0 | 9 | 126 | 14.0 | 0/100 |
| Inventive Example 3 | 0 | 18 | 42 | 2.3 | 0/100 |
| Inventive Example 4 | 0 | 6 | 150 | 25.0 | 0/100 |
| Inventive Example 5 | 0 | 16 | 84 | 5.3 | 0/100 |

TABLE 3-continued

| | | | | | |
|---|---|---|---|---|---|
| Inventive Example 6 | 0 | 10 | 24 | 2.4 | 0/100 |
| Comparative Example 1 | 0 | 7.6 | 111 | 14.6 | 100/100 |
| Comparative Example 2 | 30 | 2 | 75 | 37.5 | 100/100 |
| Comparative Example 3 | 50 | 2 | 42 | 21.0 | 100/100 |
| Comparative Example 4 | 50 | 0.6 | 6 | <1 | 3/100 |
| Comparative Example 5 | 50 | 0.5 | 9 | <1 | 4/100 |
| Comparative Example 6 | 50 | 1.5 | 22.5 | 15.0 | 100/100 |
| Comparative Example 7 | 0 | 4.9 | 39 | 8.0 | 100/100 |
| Comparative Example 3 | 20 | 3 | 3 | 1.0 | 100/100 |
| Comparative Example 9 | 0 | 13 | 17.4 | 1.3 | 0/100 |
| Comparative Example 10 | 0 | 15 | 21.3 | 1.4 | 0/100 |
| Comparative Example 11 | 0 | 17 | 24 | 1.4 | 3/100 |

| | 30-knot Water Flow Test | | 15-knot Water Flow Test | | |
|---|---|---|---|---|---|
| | Undercoat Layer | Antifouling Layer | Undercoat Layer | Antifouling Layer | Peel Property |
| Inventive Example 1 | No peeling | No peeling | No peeling | No peeling | Peel-off without breaking |
| Inventive Example 2 | No peeling | No peeling | No peeling | No peeling | Peel-off without breaking |
| Inventive Example 2 | No peeling | No peeling | No peeling | No peeling | Peel-off without breaking |
| Inventive Example 4 | No peeling | No peeling | No peeling | No peeling | Peel-off without breaking |
| Inventive Example 5 | No peeling | No peeling | No peeling | No peeling | Peel-off without breaking |
| Inventive Example 6 | No peeling | No peeling | No peeling | No peeling | Peel-off without breaking |
| Comparative Example 1 | No peeling | Complete peel-off within 1 h | No peeling | Complete peel-off within 1 h | Peel-off without breaking |
| Comparative Example 2 | Complete peel-off within 4 h | Complete peel-off within 1 h | Complete peel-off within 24 h | Complete peel-off within 1 h | Peel-off without breaking |
| Comparative Example 3 | Complete peel-off within 1 h | Complete peel-off within 1 h | Complete peel-off within 24 h | Complete peel-off within 1 h | Peel-off without breaking |
| Comparative Example 4 | Complete peel-off within 1 h | No peeling | Complete peel-off within 24 h | No peeling | Peel-off without breaking |
| Comparative Example 5 | Complete peel-off within 1 h | No peeling | Complete peel-off within 24 h | No peeling | Peel-off without breaking |
| Comparative Example 6 | Complete peel-off within 1 h | Complete peel-off within 1 h | Complete peel-off within 24 h | Complete peel-off within 1 h | Peel-off without breaking |
| Comparative Example 7 | No peeling | Complete peel-off within 1 h | No peeling | Complete peel-off within 1 h | Peel-off without breaking |
| Comparative Example 8 | Complete peel-off within 1 h | Complete peel-off within 1 h | Complete peel-off within 100 h | Complete peel-off within 1 h | Breaking before peel-off |
| Comparative Example 9 | No peeling | No peeling | No peeling | No peeling | Breaking before peel-off |
| Comparative Example 10 | No peeling | No peeling | No peeling | No peeling | Breaking before peel-off |
| Comparative Example 11 | No peeling | No peeling | No peeling | No peeling | Breaking before peel-off |

TABLE 4

| | Underwater Constant Load Peeling | Adhesive Force | Tensile Breaking Strength | Tensile Breaking Strength/Adhesive Force | Cross-Cut Stretch Test | 30-knot Water Flow Test | | 15-knot Water Flow Test | | |
|---|---|---|---|---|---|---|---|---|---|---|
| | Degree mm | N/20 mm | Strength N/20 mm | | | Undercoat Layer | Antifouling Layer | Undercoat Layer | Antifouling Layer | Peelability |
| Inventive Example 1 | 0 | 9.3 | 165 | 17.7 | 0/100 | No peeling | No peeling | No peeling | No peeling | Peel-off without breaking |
| Inventive Example 2 | 0 | 16 | 126 | 7.9 | 0/100 | No peeling | No peeling | No peeling | No peeling | Peel-off without breaking |
| Inventive Example 4 | 0 | 5 | 150 | 30.0 | 0/100 | No peeling | No peeling | No peeling | No peeling | Peel-off without breaking |
| Comparative Example 1 | 0 | 5.5 | 111 | 20.2 | 100/100 | No peeling | Complete peel-off within 1 h | No peeling | Complete peel-off within 1 h | Peel-off without breaking |
| Comparative Example 3 | 50 | 1.1 | 42 | 38.2 | 100/100 | Complete peel-off within 1 h | Complete peel-off within 1 h | Complete peel-off within 24 h | Complete peel-off within 1 h | Peel-off without breaking |
| Comparative Example 4 | 7 | 1.1 | 6 | 5.5 | 3/100 | Complete peel-off within 10 h | No peeling | Complete peel-off within 100 h | No peeling | Peel-off without breaking |
| Comparative Example 6 | 0 | >25 | 22.5 | <1 | 100/100 | No peeling | Complete peel-off within 1 h | No peeling | Complete peel-off within 1 h | Breaking before peel-off |

TABLE 4-continued

| | Underwater Constant Load Peeling Degree mm | Adhesive Force N/20 mm | Tensile Breaking Strength N/20 mm | Tensile Breaking Strength/ Adhesive Force | Cross-Cut Stretch Test | 30-knot Water Flow Test | | 15-knot Water Flow Test | | Peelability |
|---|---|---|---|---|---|---|---|---|---|---|
| | | | | | | Undercoat Layer | Antifouling Layer | Undercoat Layer | Antifouling Layer | |
| Comparative Example 7 | 50 | 0.4 | 39 | 97.5 | 100/100 | Complete peel-off within 1 h | Complete peel-off within 1 h | Complete peel-off within 24 h | Complete peel-off within 1 h | Peel-off without breaking |

TABLE 5

| | Underwater Constant Load Peeling Degree mm | Adhesive Force N/20 mm | Tensile Breaking Strength N/20 mm | Tensile Breaking Strength/ Adhesive Force | Cross-Cut Stretch Test | 30-knot Water Flow Test | | 15-knot Water Flow Test | | Peelability |
|---|---|---|---|---|---|---|---|---|---|---|
| | | | | | | Undercoat Layer | Antifouling Layer | Undercoat Layer | Antifouling Layer | |
| Inventive Example 1 | 0 | 8 | 165 | 20.6 | 0/100 | No peeling | No peeling | No peeling | No peeling | Peel-off without breaking |
| Inventive Example 2 | 0 | 9 | 126 | 14.0 | 0/100 | No peeling | No peeling | No peeling | No peeling | Peel-off without breaking |
| Inventive Example 4 | 0 | 5.6 | 150 | 26.8 | 0/100 | No peeling | No peeling | No peeling | No peeling | Peel-off without breaking |
| Inventive Example 5 | 0 | 8.3 | 84 | 10.1 | 0/100 | No peeling | No peeling | No peeling | No peeling | Peel-off without breaking |
| Comparative Example 1 | 0 | 8 | 111 | 13.9 | 100/100 | No peeling | Complete peel-off within 1 h | No peeling | Complete peel-off within 1 h | Peel-off without breaking |
| Comparative Example 2 | 0 | 4.4 | 75 | 17.0 | 100/100 | No peeling | Complete peel-off within 1 h | No peeling | Complete peel-off within 1 h | Peel-off without breaking |
| Comparative Example 3 | 3 | 3.9 | 42 | 10.8 | 100/100 | Complete peel-off within 10 h | Complete peel-off within 1 h | No peeling | Complete peel-off within 1 h | Peel-off without breaking |
| Comparative Example 4 | 0 | 17 | 6 | 0.4 | 3/100 | No peeling | No peeling | No peeling | No peeling | Breaking before peel-off |
| Comparative Example 5 | 4 | 0.5 | 9 | 18.0 | 4/100 | Complete peel-off within 10 h | No peeling | No peeling | No peeling | Peel-off without breaking |
| Comparative Example 6 | 0 | 2.9 | 22.5 | 7.8 | 100/100 | No peeling | Complete peel-off within 1 h | No peeling | Complete peel-off within 1 h | Peel-off without breaking |
| Comparative Example 7 | 0 | 4.7 | 39 | 8.3 | 100/100 | No peeling | Complete peel-off within 1 h | No peeling | Complete peel-off within 1 h | Peel-off without breaking |

TABLE 6

| | Underwater Constant Load Peeling Degree mm | Adhesive Force N/20 mm | Tensile Breaking Strength N/20 mm | Tensile Breaking Strength/ Adhesive Force | Cross-Cut Stretch Test | 30-knot Water Flow Test | | 15-knot Water Flow Test | | Peelability |
|---|---|---|---|---|---|---|---|---|---|---|
| | | | | | | Undercoat Layer | Antifouling Layer | Undercoat Layer | Antifouling Layer | |
| Inventive Example 1 | 0 | 10 | 165 | 16.5 | 0/100 | No peeling | No peeling | No peeling | No peeling | Peel-off without breaking |
| Inventive Example 2 | 0 | 5 | 126 | 25.2 | 0/100 | No peeling | No peeling | No peeling | No peeling | Peel-off without breaking |
| Comparative Example 4 | 0 | 15 | 6 | 0.4 | 3/100 | No peeling | No peeling | No peeling | No peeling | Breaking before peel-off |
| Comparative Example 7 | 0.1 | 9.3 | 39 | 4.2 | 100/100 | No peeling | Complete peel-off within 1 h | No peeling | Complete peel-off within 1 h | Peel-off without breaking |

TABLE 7

| | Underwater Constant Load Peeling | Adhesive Force | Tensile Breaking | Tensile Breaking Strength/ Adhesive | Cross-Cut Stretch | 30-knot Water Flow Test | | 15-knot Water Flow Test | | |
|---|---|---|---|---|---|---|---|---|---|---|
| | Degree mm | N/20 mm | Strength N/20 mm | Force | Test | Undercoat Layer | Antifouling Layer | Undercoat Layer | Antifouling Layer | Peelability |
| Inventive Example 1 | 0 | 8 | 165 | 20.6 | 0/100 | No peeling | No peeling | No peeling | No peeling | Peel-off without breaking |
| Inventive Example 2 | 0 | 7.3 | 126 | 17.3 | 0/100 | No peeling | No peeling | No peeling | No peeling | Peel-off without breaking |
| Comparative Example 5 | 50 | 2.1 | 9 | 4.3 | 4/100 | Complete peel-off within 1 h | No peeling | Complete peel-off within 24 h | No peeling | Breaking before peel-off |
| Comparative Example 7 | 50 | 2 | 39 | 19.5 | 100/100 | Complete peel-off within 1 h | Complete peel-off within 1 h | Complete peel-off within 24 h | Complete peel-off within 1 h | Peel-off without breaking |

Referring to Table 3 to Table 7, with regard to Inventive Examples 1 and 2, it was verified that, even in the cases where the adherend was changed from the PMMA plate to any one of the gel coat, the coating film formed from the epoxy paint, the coating film formed from the enamel, the coating film formed from the antifouling paint, and aluminum, no peeling occurred in the 15-knot and 30-knot water flow tests, and the coating film could be peeled off without breaking in the evaluation of peelability.

Further, with regard to Inventive Example 3, it was verified that, even in the case where the adherend was changed from the PMMA plate to the gel coat (trade name "White Coat", manufacturer: Kohshin Chemical Co., Ltd.), no peeling occurred in the 15-knot and 30-knot water flow tests, and the coating film could be peeled off without breaking in the evaluation of peelability.

With regard to Inventive Example 4, it was verified that, even in the cases where the adherend was changed from the PMMA plate to any one of the gel coat (trade name "White Coat", manufacturer: Kohshin Chemical Co., Ltd.), the coating film formed from the epoxy paint (trade name "SEAJET03", manufacturer: CHUGOKU MARINE PAINTS, Ltd.) and the coating film formed from the enamel paint (trade name "SEAJET015", manufacturer: CHUGOKU MARINE PAINTS, Ltd.), no peeling occurred in the 15-knot and 30-knot water flow tests, and the coating film could be peeled off without breaking in the evaluation of peelability.

With regard to Inventive Example 5, it was verified that, even in the case where the adherend was changed from the PMMA plate to one of the gel coat (trade name "White Coat", manufacturer: Kohshin Chemical Co., Ltd.) and the coating film formed from the enamel paint (trade name "SEAJET015", manufacturer: CHUGOKU MARINE PAINTS, Ltd.), no peeling occurred in the 15-knot and 30-knot water flow tests, and the coating film could be peeled off without breaking in the evaluation of peelability.

With regard to Inventive Example 6, it was verified that, even in the case where the adherend was changed from the PMMA plate to the gel coat (trade name "White Coat", manufacturer: Kohshin Chemical Co., Ltd.), no peeling occurred in the 15-knot and 30-knot water flow tests, and the coating film could be peeled off without breaking in the evaluation of peelability.

Thus, in a case where a coating film comprising a 150 μm-thick undercoat layer and a 100 μm-thick antifouling layer is formed on PMMA serving as an adherend, wherein the 100-gram underwater constant load peeling degree of the coating film is less than 5 (mm/20 mm); the ratio of the tensile breaking strength (N/20 mm) of the coating film to the adhesive force (N/20 mm) of the coating film with respect to the adherend, as measured after immersing the coating film for 5 weeks in pure water at 60° C., is 1.5 or more; and the 1-mm square cross-cut stretching-caused peeling degree of the antifouling layer with respect to the undercoat layer is 0.05 or less, it is possible to bring out an advantageous effect that the coating film is less likely to peel even during use under water, and it is capable of being easily peeled off after use, when used on at least one or more of the above adherends each serving as an underwater structure. That is, in another aspect, the present invention encompasses a set of coating materials comprising an undercoat layer-forming coating material and an antifouling layer-forming coating material, which have the above properties. In yet another aspect, the present invention encompasses an undercoat layer-forming coating material having the above properties, wherein a coating film comprises a 150 μm-thick undercoat layer, and an antifouling layer typically made of a silicone resin or a copper-based compound and formed to have a thickness of, e.g., 100 μm-thick, and wherein the coating film is bonded on PMMA serving as the adherend.

[Application to Structure Other than Underwater Structure]

A coating film was produced using a set of coating materials comprising one of the undercoat layer-forming coating materials in the above Inventive and Comparative Examples and undercoat layer-forming coating materials in the following Inventive Examples 11 to 15, and the aforementioned antifouling layer-forming coating material, and subjected to evaluations of the adhesive force, the tensile breaking strength, the 1-mm square cross-cut stretching-caused peeling degree and the peelability. Their results are presented in Table 8. Each of the adhesive force, the tensile breaking strength and the peelability were measured in the following manner, and the 1-mm square cross-cut stretching-caused peeling degree was measured in the aforementioned manner.

Inventive Example 11

Except that the resin composition of the undercoat layer-forming coating material was changed to urethane emulsion (trade name "SUPERFLEX 470", manufacturer: DKS Co. Ltd.), an undercoat layer-forming coating material and an antifouling layer-forming coating material were produced through the same operation as that in Inventive Example 1.

Inventive Example 12

Except that the resin composition of the undercoat layer-forming coating material was changed to ionomer-butyl (no trade name, manufacturer: Lanxess AG), an undercoat layer-forming coating material and an antifouling layer-forming coating material were produced through the same operation as that in Inventive Example 1.

Inventive Example 13

In Inventive Example 13, an undercoat layer-forming coating material and an antifouling layer-forming coating material were produced through the same operation as that in Inventive Example 1, except that the resin composition of the undercoat layer-forming coating material was prepared by adding a rosin resin (trade name "Pensel D135", manufacturer: Arakawa Chemical Industries, Ltd., in an amount of 23 weight %, to non-modified SEBS (styrene content: 30 weight %) which is different from the modified SEBS in Inventive Example 1, to thereby improve the adhesive force.

Inventive Example 14

In Inventive Example 14, an undercoat layer-forming coating material and an antifouling layer-forming coating material were produced through the same operation as that in Inventive Example 1, except that the resin composition of the undercoat layer-forming coating material was prepared by adding alkoxysilicone oligomer (trade name "KC-89S", manufacturer: Shin-Etsu Chemical Co., Ltd.) in an amount of 5 weight % to non-modified SEBS (styrene content: 30 weight %) which is different from the modified SEBS in Inventive Example 1, to thereby improve the adhesive force.

Inventive Example 15

In Inventive Example 15, an undercoat layer-forming coating material and an antifouling layer-forming coating material were produced through the same operation as that in Inventive Example 1, except that the resin composition of the undercoat layer-forming coating material was prepared by adding hydrogen-modified silicone oil (trade name "KF9901", manufacturer: Shin-Etsu Chemical Co., Ltd.) in an amount of 23 weight % to non-modified SEBS (styrene content: 30 weight %) which is different from the modified SEBS in Inventive Example 1, to thereby improve the adhesive force.

(Adhesive Force)

The coating film (laminate) consisting of the 150 μm-thick undercoat layer and the 100 μm-thick antifouling layer was formed on the PMMA plate (trade name "Deraglass" manufactured by ASAHIKASEI TECHNOPLUS Corporation, methyl methacrylate polymer: 96.6% or more), through the same operation as that in the above underwater constant load peel test. The formed coating film was trimmed to have a size of 20 mm×100 mm. A force measured when peeling the laminate from the PMMA plate at a peel angle of 180 degrees and at a peel rate of 300 mm/min, using a tensile tester (AUTOGRAPH AGS-X, manufacturer: Shimadzu Corporation) was defined as the adhesive force.

(Tensile Breaking Strength)

The undercoat layer-forming coating material was coatingly applied to a surface of a separator (trade name "MRF38", manufacturer: Mitsubishi Plastics, Inc., thickness: 50 μm) by an applicator, and dried at room temperature for 12 hours to form an undercoat layer having a thickness of 150 μm. The antifouling layer-forming coating material was coatingly applied onto the formed undercoat layer by an applicator, and dried at room temperature for 12 hours to form an antifouling layer having a thickness of 100 μm. In this way, a coating film composed of a laminate of the undercoat layer and the antifouling layer was formed on the separator. The obtained laminate of the undercoat layer and the antifouling layer was trimmed to have a size of 20 mm×100 mm, and the tensile breaking strength of the trimmed laminate was evaluated, using a tensile tester (device name "AUTOGRAPH AGS-X", manufacturer: Shimadzu Corporation).

FIG. 6 is a schematic diagram for explaining a verification test about peelability. The coating film (laminate) consisting of the 150 μm-thick undercoat layer and the 100 μm-thick antifouling layer was formed on the PMMA plate (trade name "Deraglass", manufacturer: ASAHIKASEI TECHNOPLUS Corporation, methyl methacrylate polymer: 96.6% or more), through the same operation as that in the above underwater constant load peel test. The obtained laminate of the undercoat layer and the antifouling layer was trimmed to have a size of 20 mm×100 mm. It was evaluated whether the undercoat layer breaks when peeling the coating film from the PMMA plate at a peel angle of 145 to 180° (in a direction indicated by the arrowed line 7 in FIG. 7).

TABLE 8

|  | Adhesive Force N/20 mm | Tensile Breaking Strength N/20 mm | Tensile Breaking Strength/ Adhesive Force | Cross-Cut Stretch Test | Peelability |
|---|---|---|---|---|---|
| Inventive Example 1 | 7 | 165 | 23.6 | 0/100 | Peel-off without breaking |
| Inventive Example 2 | 8 | 126 | 15.8 | 0/100 | Peel-off without breaking |
| Inventive Example 3 | 20 | 42 | 2.1 | 0/100 | Peel-off without breaking |
| Inventive Example 4 | 56 | 150 | 26.8 | 0/100 | Peel-off without breaking |
| Inventive Example 5 | 14 | 84 | 6.0 | 0/100 | Peel-off without breaking |
| Inventive Example 6 | 13 | 24 | 113 | 0/100 | Peel-off without breaking |
| Inventive Example 7 | 7.5 | 54 | 7.2 | 0/100 | Peel-off without breaking |
| Inventive Example 8 | 39.9 | 150 | 3.8 | 0/100 | Peel-off without breaking |
| Inventive Example 9 | 3.88 | 7.5 | 1.9 | 0/100 | Peel-off without breaking |
| Inventive Example 10 | 4.92 | 17.7 | 3.6 | 0/100 | Peel-off without breaking |
| Inventive Example 11 | 9.52 | 186 | 19.5 | 0/100 | Peel-off without breaking |
| Inventive Example 12 | 2.9 | 23.7 | 8.2 | 0/100 | Peel-off without breaking |

TABLE 8-continued

|  | Adhesive Force N/20 mm | Tensile Breaking Strength N/20 mm | Tensile Breaking Strength/ Adhesive Force | Cross-Cut Stretch Test | Peelability |
|---|---|---|---|---|---|
| Inventive Example 13 | 7.3 | 135 | 18.5 | 0/100 | Peel-off without breaking |
| Inventive Example 14 | 0.8 | 126 | 157.5 | 0/100 | Peel-off without breaking |
| Inventive Example 15 | 5.41 | 111 | 20.5 | 0/100 | Peel-off without breaking |
| Comparative Example 1 | 6.8 | 111 | 16.3 | 100/100 | Peel-off without breaking |
| Comparative Example 2 | 1.5 | 84 | 56.0 | 100/100 | Peel-off without breaking |
| Comparative Example 3 | 5 | 60 | 12.0 | 100/100 | Peel-off without breaking |
| Comparative Example 4 | >25 | 150 | <1 | 3/100 | Breaking before peel-off |
| Comparative Example 5 | >25 | 171 | <1 | 4/100 | Breaking before peel-off |
| Comparative Example 6 | 0.3 | 22.5 | 75.0 | 100/100 | Peel-off without breaking |
| Comparative Example 7 | 0.7 | 57 | 81.4 | 100/100 | Peel-off without breaking |
| Comparative Example 8 | 1 | 57 | 57.0 | 100/100 | Peel-off without breaking |
| Comparative Example 9 | 13.7 | 17.4 | 1.3 | 0/100 | Breaking before peel-off |
| Comparative Example 10 | 17 | 21.3 | 1.3 | 0/100 | Breaking before peel-off |
| Comparative Example 11 | 18 | 24 | 1.3 | 3/100 | Breaking before peel-off |
| Comparative Example 12 | >25 | 1 | <1 | 0/100 | Breaking before peel-off |
| Comparative Example 13 | >25 | inevaluable | — | 0/100 | Breaking before peel-off |
| Comparative Example 14 | >25 | inevaluable | — | 0/100 | Breaking before peel-off |
| Comparative Example 15 | >25 | inevaluable | — | 0/100 | Breaking before peel-off |
| Comparative Example 16 | <1 | 6 | >1.5 | 100/100 | Peel-off without breaking |

Referring to Table 8, in Inventive Examples 1 to 15 including Inventive Examples in which the 100-gram underwater constant load peeling degree is 5 or less, the adhesive force is 0.5 (mm/20 mm) or more, i.e., the coating film exhibits a sufficiently high adhesive force with respect to the adherend and never easily peels from the adherend even on land to be exposed to weather. The 1-mm square cross-cut stretching-caused peeling degree is 0.00, and thereby adhesion between the undercoat layer and the silicone resin as the antifouling layer is relatively high, so that the antifouling layer is less likely to peel from the undercoat layer, as with the case where the coating film is used under water. Further, the ratio of the tensile breaking strength to the adhesive force is as sufficiently high as 1.5 or more. Thus, it was verified that the coating film can be peeled off without breaking. Regarding applications to a structure other than the underwater structure, it was also verified that the coating film is usable as a primer for silicone paint, e.g., an antifouling layer to be formed on a surface of any of various exterior members such as a roof and an external wall.

LIST OF REFERENCE SIGNS

1: coating film
2: undercoat layer
3: antifouling layer
4: adherend
5: stretching direction
6: water flow direction
7: pulling direction

The invention claimed is:
1. A coating film on an underwater structure, comprising:
an undercoat layer bonded to the underwater structure; and
an antifouling layer bonded to the undercoat layer, wherein:
a 100-gram underwater constant load peeling degree of the coating film is less than 5 (mm/20 mm);
a ratio of a tensile breaking strength of the coating film to an adhesive force of the coating film with respect to the underwater structure, as measured after immersing the coating film in pure water at 60° C. for 5 weeks, is 1.5 or more, wherein the unit of measurement for each of the tensile breaking strength and the adhesive force is N/20 mm;
a 1-mm square cross-cut stretching-caused peeling degree of the antifouling layer with respect to the undercoat layer is 0.05 or less;
the undercoat layer comprises a styrene-based thermoplastic elastomer with a styrene content of 20 to 40 weight %;
the styrene-based thermoplastic elastomer is modified by a compound containing a polar group having a content of 0.1 to 20 weight % in the styrene-based thermoplastic elastomer;
the 100-gram underwater constant load peeling degree is measured as follows:
the coating film is formed on a poly (methyl methacrylate) (PMMA) plate;
subsequently, the coating film is trimmed to have a size of 20 mm×100 mm; then, with respect to the PMMA plate, the trimmed coating film is peeled from the side of one short side having a length of 20 mm thereof by a length of 20 mm, and folded back by 180°; and the short side is attached to an end of a polyethylene terephthalate (PET) film, such that a contact area therebetween becomes 20 mm×20 mm; a weight member having a weight adjusted to become 100 g under water is attached to the PET film to prepare a test sample; a tank filled with pure water at 23° C. is prepared; then, the sample is immersed in the pure water such that a peel angle of the sample becomes 180 degrees; and a distance over which the coating film is peeled from the PMMA plate in one hour is measured as the 100-gram underwater constant load peeling degree;
the ratio of the tensile breaking strength of the coating film to the adhesive force of the coating film with respect to the underwater structure, as measured after immersing the coating film in pure water at 60° C. for 5 weeks, is measured as follows:
after immersing the coating film in pure water at 60° C. for 5 weeks, the coating film is trimmed to have a size of 20 mm×100 mm; a force measured when peeling the coating film from the PMMA plate at a peel angle of 180 degrees and at a peel rate of 300 mm/min, using a tensile tester is defined as the adhesive force;

after immersing the coating film in pure water at 60° C. for 5 weeks, the coating film is trimmed to have a size of 20 mm×60 mm, and the tensile breaking strength of the trimmed coating film is evaluated, using a tensile tester;

the ratio of the tensile breaking strength and the adhesive force measured is the ratio of the tensile breaking strength to the adhesive force to the underwater structure, as measured after immersing the coating film in pure water at 60° C. for 5 weeks; and the cross-cut stretching-caused peeling degree is measured as follows:

the coating film is cut into 20 mm×60 mm; and only the antifouling layer is slit by a cutter, using a cross-cut test cutter guide, to form 100 cross-cut cells that are each 1 cm² at intervals of 1 mm; then, the coating film having the cross-cut cells is stretched along a diagonal line of the cross-cut cells at a stretching ratio of 2; and the cross-cut stretching peeling degree is based on a counted quantity of individual cross-cut cells peeled from the undercoat layer by the coating film having the cross-cut cells being stretched along the diagonal line of the cross-cut cells at the stretching ratio of 2.

2. The coating film as recited in claim 1, wherein the antifouling layer comprises a silicone resin.

3. The coating film as recited in claim 1, wherein the underwater constant load peeling degree is less than 0.5.

4. The coating film as recited in claim 3, wherein the underwater constant load peeling degree is less than 0.1.

5. The coating film as recited in claim 1, wherein the ratio is 5.0 or more.

6. The coating film as recited in claim 1, wherein the adhesive force is from 4.0 to 15 N/20 mm.

7. An undercoat layer-forming coating material for forming the undercoat layer comprised in the coating film as recited in claim 1.

\* \* \* \* \*